United States Patent
Maharaj

(10) Patent No.: US 9,913,211 B2
(45) Date of Patent: Mar. 6, 2018

(54) GLOBAL E-MARKETPLACE FOR MOBILE SERVICES

(71) Applicant: Gigsky, Inc., Palo Alto, CA (US)

(72) Inventor: Ravi Rishy Maharaj, Palo Alto, CA (US)

(73) Assignee: GIGSKY, INC., Palo Alto, CA (US)

( * ) Notice: Subject to any disclaimer, the term of this patent is extended or adjusted under 35 U.S.C. 154(b) by 208 days.

(21) Appl. No.: 14/171,720

(22) Filed: Feb. 3, 2014

(65) Prior Publication Data

US 2014/0148162 A1     May 29, 2014

Related U.S. Application Data

(63) Continuation-in-part of application No. 13/480,343, filed on May 24, 2012, now Pat. No. 9,173,093.
(Continued)

(51) Int. Cl.

| | |
|---|---|
| *H04W 48/16* | (2009.01) |
| *H04W 48/18* | (2009.01) |
| *H04W 64/00* | (2009.01) |
| *H04M 15/00* | (2006.01) |
| *H04M 17/02* | (2006.01) |
| *H04W 4/24* | (2018.01) |
| *H04W 12/04* | (2009.01) |
| *H04W 12/06* | (2009.01) |

(Continued)

(52) U.S. Cl.
CPC ......... *H04W 48/18* (2013.01); *H04L 63/0853* (2013.01); *H04M 15/751* (2013.01); *H04M 15/7556* (2013.01); *H04M 15/7655* (2013.01); *H04M 15/773* (2013.01); *H04M 17/026* (2013.01); *H04W 4/24* (2013.01); *H04W 12/04* (2013.01); *H04W 12/06* (2013.01); *H04W 48/16* (2013.01); *H04W 64/003* (2013.01); *H04W 8/183* (2013.01); *H04W 76/02* (2013.01)

(58) Field of Classification Search
CPC ............ H04L 63/0853; H04M 15/751; H04M 15/7556; H04M 15/7655; H04M 15/773; H04M 17/026; H04W 12/04; H04W 12/06; H04W 4/24; H04W 48/16; H04W 48/18; H04W 64/003; H04W 76/02; H04W 8/18
USPC ......................................... 370/259, 338, 464
See application file for complete search history.

(56) References Cited

U.S. PATENT DOCUMENTS

| | | |
|---|---|---|
| 5,943,619 A | 8/1999 | Coyne et al. |
| 6,081,711 A | 6/2000 | Geulen |

(Continued)

FOREIGN PATENT DOCUMENTS

| | | |
|---|---|---|
| EP | 2139170 A1 | 12/2009 |
| EP | 2139180 A1 | 12/2009 |

(Continued)

*Primary Examiner* — Mark Rinehart
*Assistant Examiner* — Natali N Pascual Peguero
(74) *Attorney, Agent, or Firm* — Bowen Liu; Jennifer A. Haynes; David Lewis

(57) ABSTRACT

A method for providing an online market place for purchasing service from a variety of servers is provided. A GUI or application having a page having a list of carriers for the user to select is sent to a mobile device. A selection of a carrier is received. In response, an encrypted IMSI and Ki are sent to the mobile device. The GUI or application may include other pages for the user to manage service.

20 Claims, 24 Drawing Sheets

Related U.S. Application Data which is a continuation-in-part of application No. 13/479,091, filed on May 23, 2012, now Pat. No. 8,849,249.

(60) Provisional application No. 61/759,399, filed on Feb. 1, 2013, provisional application No. 61/759,691, filed on Feb. 1, 2013, provisional application No. 61/759,660, filed on Feb. 1, 2013, provisional application No. 61/489,636, filed on May 24, 2011, provisional application No. 61/489,228, filed on May 23, 2011.

(51) Int. Cl.
*H04L 29/06* (2006.01)
*H04W 8/18* (2009.01)
*H04W 76/02* (2009.01)

(56) References Cited

U.S. PATENT DOCUMENTS

| | | | |
|---|---|---|---|
| 6,414,944 B1* | 7/2002 | Kolev | H04B 7/18539 370/316 |
| 6,507,649 B1 | 1/2003 | Tovander | |
| 6,515,997 B1 | 2/2003 | Feltner et al. | |
| 6,782,258 B2 | 8/2004 | Ung et al. | |
| 6,823,061 B2 | 11/2004 | Prasad et al. | |
| 7,151,931 B2 | 12/2006 | Tsao et al. | |
| 7,664,504 B2 | 2/2010 | Bishop | |
| 7,818,000 B2 | 10/2010 | Lin et al. | |
| 8,086,855 B2 | 12/2011 | Katz et al. | |
| 8,095,111 B2 | 1/2012 | Henry, Jr. et al. | |
| 8,117,123 B1 | 2/2012 | Gailloux et al. | |
| 8,331,907 B2 | 12/2012 | Jiang | |
| 8,391,915 B2 | 3/2013 | Bishop | |
| 8,478,238 B2 | 7/2013 | Mohammed et al. | |
| 8,520,583 B2 | 8/2013 | Kasslin et al. | |
| 8,849,249 B2 | 9/2014 | Rishy-Maharaj et al. | |
| 9,173,093 B2 | 10/2015 | Rishy-Maharaj et al. | |
| 2002/0025809 A1 | 2/2002 | Ung et al. | |
| 2003/0036379 A1* | 2/2003 | Nikolai | H04W 4/02 455/414.1 |
| 2003/0118001 A1 | 6/2003 | Prasad et al. | |
| 2003/0120920 A1 | 6/2003 | Svensson | |
| 2003/0235175 A1 | 12/2003 | Naghian et al. | |
| 2004/0128509 A1 | 7/2004 | Gehrmann | |
| 2004/0185828 A1* | 9/2004 | Engelhart | H04M 15/00 455/408 |
| 2004/0192295 A1 | 9/2004 | Tsao et al. | |
| 2004/0235455 A1 | 11/2004 | Jiang | |
| 2005/0079863 A1* | 4/2005 | Macaluso | H04W 4/00 455/419 |
| 2006/0205434 A1* | 9/2006 | Tom | H04W 8/26 455/558 |
| 2006/0246949 A1* | 11/2006 | Gupta | H04W 4/24 455/558 |
| 2006/0252409 A1* | 11/2006 | Brenchley | G06Q 10/10 455/405 |
| 2006/0291455 A1 | 12/2006 | Katz et al. | |
| 2007/0015514 A1 | 1/2007 | Bishop | |
| 2007/0027815 A1 | 2/2007 | Sobel et al. | |
| 2007/0281694 A1 | 12/2007 | Lin et al. | |
| 2008/0090568 A1 | 4/2008 | Venkateswarlu | |
| 2008/0107064 A1 | 5/2008 | Erol et al. | |
| 2009/0029736 A1* | 1/2009 | Kim | H04M 1/72522 455/558 |
| 2009/0061932 A1* | 3/2009 | Nagarajan | H04W 8/18 455/558 |
| 2009/0181662 A1 | 7/2009 | Fleischman et al. | |
| 2009/0217058 A1 | 8/2009 | Obereiner et al. | |
| 2009/0305666 A1 | 12/2009 | Tian et al. | |
| 2009/0312006 A1* | 12/2009 | Montes | H04W 4/00 455/422.1 |
| 2010/0099401 A1 | 4/2010 | Bishop | |
| 2010/0125495 A1* | 5/2010 | Smith | G06Q 20/3223 705/14.23 |
| 2010/0135491 A1* | 6/2010 | Bhuyan | H04L 63/0869 380/247 |
| 2010/0311468 A1* | 12/2010 | Shi | H04W 4/003 455/558 |
| 2011/0054990 A1 | 3/2011 | Bogdan | |
| 2011/0159843 A1* | 6/2011 | Heath | H04W 8/18 455/411 |
| 2011/0176424 A1 | 7/2011 | Yang et al. | |
| 2011/0235792 A1 | 9/2011 | Foster et al. | |
| 2011/0283001 A1 | 11/2011 | Jung et al. | |
| 2012/0260095 A1 | 10/2012 | Von Hauck et al. | |
| 2012/0275442 A1 | 11/2012 | Malets et al. | |
| 2012/0281609 A1 | 11/2012 | Kasslin et al. | |
| 2012/0282891 A1 | 11/2012 | Mohammed et al. | |
| 2012/0282924 A1 | 11/2012 | Tagg et al. | |
| 2013/0132854 A1 | 5/2013 | Raleigh et al. | |
| 2013/0217361 A1 | 8/2013 | Mohammed et al. | |
| 2013/0273911 A1 | 10/2013 | Mohammed et al. | |
| 2014/0012627 A1 | 1/2014 | Swanson et al. | |
| 2014/0012699 A1 | 1/2014 | Abdelrahman et al. | |
| 2014/0012707 A1 | 1/2014 | Abdelrahman et al. | |
| 2014/0012708 A1 | 1/2014 | Abdelrahman et al. | |
| 2014/0012709 A1 | 1/2014 | Bishop et al. | |
| 2014/0012710 A1 | 1/2014 | Abdelrahman et al. | |
| 2014/0012711 A1 | 1/2014 | Dey et al. | |
| 2014/0012712 A1 | 1/2014 | Eng et al. | |
| 2014/0012713 A1 | 1/2014 | Bishop et al. | |
| 2014/0012856 A1 | 1/2014 | Abdelrahman et al. | |
| 2014/0220930 A1 | 8/2014 | Maharaj | |

FOREIGN PATENT DOCUMENTS

| | | |
|---|---|---|
| EP | 2432278 A1 | 3/2012 |
| WO | WO/1998/049860 A2 | 11/1998 |
| WO | WO/2000/036852 A2 | 6/2000 |
| WO | WO/2000/078068 A1 | 12/2000 |
| WO | WO/2002/005531 A1 | 1/2002 |
| WO | WO/2002/093811 A2 | 11/2002 |
| WO | WO/2004/075484 A2 | 9/2004 |
| WO | WO/2007/011632 A1 | 1/2007 |
| WO | WO/2008/087251 A1 | 7/2008 |
| WO | WO/2009/060261 A2 | 5/2009 |
| WO | WO/2009/149600 A1 | 12/2009 |
| WO | WO/2009/151553 A1 | 12/2009 |
| WO | WO/2012/038696 A1 | 3/2012 |
| WO | Wo/2012/150376 A1 | 11/2012 |
| WO | WO/2013/085852 A1 | 6/2013 |
| WO | WO/2013/142615 A1 | 9/2013 |
| WO | WO/2013/160673 A1 | 10/2013 |

\* cited by examiner

GLOBAL E-MARKETPLACE FOR MOBILE SERVICES

CROSS-REFERENCE TO RELATED APPLICATIONS

This application claims priority to:

U.S. Provisional Patent Application No. 61/759,399, entitled "Secure Over the Air SIM provisioning," filed Feb. 1, 2013, by Ravi Rishy-Maharaj;

U.S. Provisional Patent Application No. 61/759,691, entitled "GLOBAL e-MARKETPLACE FOR MOBILE SERVICES," filed Feb. 1, 2013, by Ravi Rishy-Maharaj; and U.S. Provisional Patent Application No. 61/759,660, entitled "GIFTING PREPAID DATA PLANS," filed Feb. 1, 2013, by Ravi Rishy-Maharaj;

this application is also a continuation in-part of U.S. patent application Ser. No. 13/480,343 entitled, "DEVICES AND SYSTEMS THAT OBTAIN AND MANAGE SUBSCRIPTIONS FOR ACCESSING WIRELESS NETWORKS ON AN AD HOC BASIS AND METHODS OF USE," filed May 24, 2012, by Ravi Rishy-Maharaj., et al. which claims priority benefit to U.S. Provisional Application No. 61/489,636, entitled, "SYSTEMS AND METHODS FOR REUSING A SUBSCRIBER IDENTITY MODULE FOR MULTIPLE NETWORKS," filed May 24, 2011, by Ravi Rishy-Maharaj; and this application is a continuation in-part of U.S. patent application Ser. No. 13/479,091, entitled, "DEVICES AND SYSTEMS THAT OBTAIN AND MANAGE SUBSCRIPTIONS FOR ACCESSING WIRELESS NETWORKS ON AN AD HOC BASIS AND METHODS," filed May 23, 2012 by Ravi Rishy-Maharaj et al., which claims priority benefit to U.S. Provisional Patent Application No. 61/489,228, entitled "DEVICES AND SYSTEMS THAT OBTAIN AND MANAGE SUBSCRIPTIONS FOR ACCESSING WIRELESS NETWORKS ON AN AD HOC BASIS AND METHODS OF USE," filed May 23, 2011, by Ravi Rishy-Maharaj. All of the above applications are incorporated herein by reference in their entirety.

FIELD

This specification generally relates to providing wireless service to users.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

When one wants to select a phone service for a mobile device, the customer needs to have a phone that has a Subscriber Identity Module (SIM) with an International Mobile Subscription Identity (IMSI) and Ki from that carrier to use the desired service. As a consequence, someone that wants to switch carriers typically needs to buy a new phone in order to have a phone with a SIM having an IMSI and Ki associated with the new carrier, because, even when using the same model phone for two different providers, the SIM cards are not interchangeable.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-2 and 4B-20 is a brief description of each element, which may have no more than the name of each of the elements in the one of FIGS. 1-2 and 4B-20 that is being discussed. After the brief description of each element, each element is further discussed in numerical order. In general, each of FIGS. 1-20 is discussed in numerical order and the elements within FIGS. 1-20 are also usually discussed in numerical order to facilitate easily locating the discussion of a particular element. Nonetheless, there is no one location where all of the information of any element of FIGS. 1-20 is necessarily located. Unique information about any particular element or any other aspect of any of FIGS. 1-20 may be found in, or implied by, any part of the specification.

In an embodiment, a platform is provided for network operators (carriers) to sell prepaid data plans. People with a SIM from the company that purchased the prepaid data plan for resale, can choose a specific plan from a selection of mobile network carriers and buy a plan using either a smart-phone application, other application, or website. The selected plan can then be configured remotely into the SIM of the company (the primary carrier) that resells the prepaid plan and made available for use without having to replace the SIM in the user's device.

Consequently, there is no need to replace a SIM in a mobile device in order to get network services from a multitude of network operators or carriers.

In various places in discussing the drawings a range of letters, such as a-n are used to refer to individual elements of various series of elements that are the same. In each of these series, the ending letters are integer variables that can be any number. Unless indicated otherwise, the number of elements in each of these series is unrelated to the number of elements in others of these series. Specifically, even though one letter (e.g. "c") comes earlier in the alphabet than another letter (e.g., "f"), the order of these letters in the alphabet does not mean that the earlier letter represents a smaller number. The value of the earlier letter is unrelated to the later letter, and may represent a value that is greater the same or less than the later letter.

Figure 1A:
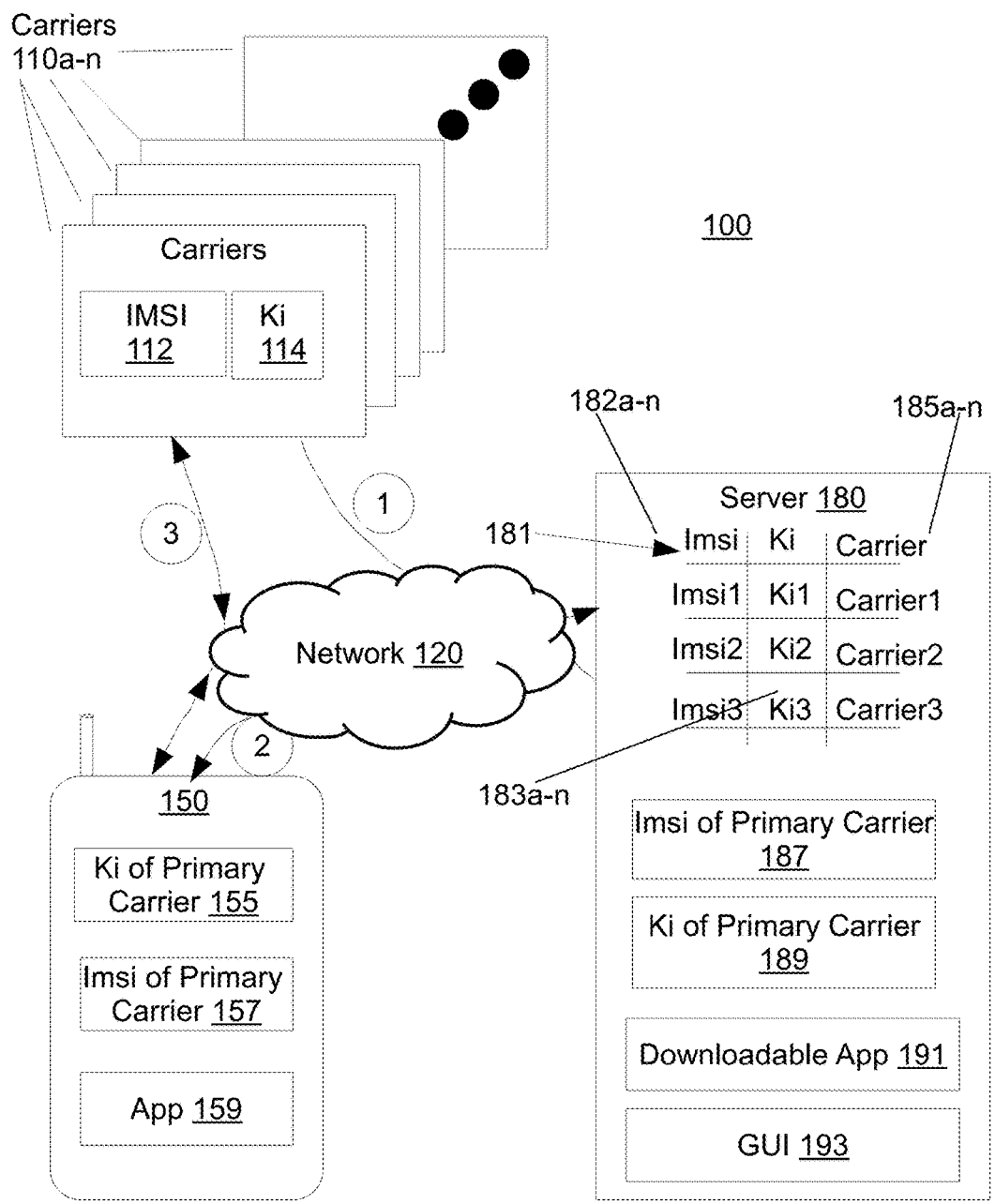
FIG. 1A shows a block diagram of an embodiment of a system for providing wireless phone service in multiple locations in which that are not all covered by the same phone service.

FIG. 1A shows an embodiment of a system for providing wireless phone service in multiple locations that are not all covered by the same phone service. The system 100 may include one or more carriers 110a-n, each of carriers 110a-n may have an IMSI 112 and a Ki 114. System 100 may also include a network 120 and a wireless device 150, which may include a Ki of the primary carrier 155, an IMSI of the primary carrier 157, and optionally an application 159. System 100 may include a server 180, including a collection of IMSI's 181, which has one or more IMSI's 182a-n and Ki's 183a-d associated with one or more carriers 185a-n, an IMSI of the primary carrier 187, and the Ki of the primary carrier 189, optionally a downloadable application 191, and optionally a graphical user interface (GUI) 193. In other embodiments, the system 100 may not have all of the elements listed and/or may have other elements in addition to or instead of those listed.

In an embodiment, a security mechanism to remotely reprogram a SIM (Subscriber Identity Module) is provided. The method includes using the security credentials of one network to encrypt and securely transmit the credentials of another network for reprogramming on the SIM.

The one or more carriers 110a-n are providers of wireless communications services that own or control the elements necessary to sell and deliver services to an end user including radio spectrum allocation. What distinguishes carriers from other networks is that the carrier owns or controls access to a radio spectrum license from a regulatory or government entity. In an embodiment, carriers s 110a-n require that a wireless device have a manufacturer installed K code that is known only to the mobile network operator, the original manufacturer, and the device memory system allow the wireless device access to the local network. The carrier allows the wireless device to connect and transmit Ks and IMSIs to the wireless device or to the SIM device of wireless device. Examples of carriers are AT&T, NTT Docomo, SingTel, and T-mobile, Vodafone India, Aircel India, Idea, Tata Teleservices, Vodafone, Airtel, Vodafone UK, MTS, Astelit, Kyivstar, and O2.

Each carrier 110 has an International Mobile Subscription Identity (IMSI) 112 and a Ki 114. The IMSI 112 and Ki 114 are used for communication between the carrier and the phone.

The IMSI 112 may be a number used to identify an individual or device on a mobile network. The IMSI 112 may include a mobile country code, a mobile network code and the mobile subscriber identity number. The location area number may describe the location of the wireless device. IMSI 112 is issued by the carrier and conventionally when a user buys a SIM, the SIM comes with an IMSI.

The K or $K_i$ 114 may be a 128 bit code that is present on SIM devices (in SIM devices the K or $K_i$ is not changed after the manufacturing or personalization process). Network 120 is any network or combination of networks of devices that communicate with one another. For example, network 120 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

A wireless device 150 is a device that has a SIM that may be written to and/or reprogrammed, so that an IMSI and Ki of a local carrier may be dynamically added to the SIM by the user whenever the user chooses to use another carrier.

Although illustrated as a phone, the wireless device 150 may be a portable routing device that is capable of connecting to secure networks that require subscriptions on an ad hoc basis. A mobile phone of the user communicates with wireless device 150. In another embodiment, wireless device 150 may be any wireless electronic device capable of connecting to a network, such as a phone, personal desktop assistant ("PDA"), laptop computer, tablet, or netbook, for example. The wireless device 150 may communicate with other networks and devices using any wireless protocol including, for example, Wi-Fi, Wi-Max, 2G, 3G, 4G, 4G LTE, UMTS, other satellite communication, or radio via a transceiver. The wireless device 150 may be configured to communicate wirelessly with a local hotspot network, the local mobile server system, the service fulfillment network and/or the networked device.

In one embodiment, the wireless device 150 may have a simulated universal subscriber identity module ("SIM/USIM") stored in the wireless device memory system. Credentials may be electronically transmitted to a SIM. In one embodiment, the wireless device 150 may connect to code division multiple access networks ("CDMA") and do so using a removable user identity module ("R-UIM") in substantially the same way as a SIM. Wireless device 150 is discussed further in conjunction with FIG. 2B.

Ki of the primary carrier 155 is the Ki used by the primary carrier, which wireless device 150 uses to establish communications with server 180 of the primary carrier. Wireless device 150 needs Ki of primary carrier 155 to communicate with the primary carrier associated with server 180. Ki of primary carrier 155 is used to encrypt the IMSI of the primary carrier, in communications between the primary carrier and the user. IMSI of the primary carrier 157 functions to allow use of the plan chosen. IMSI of the primary carrier 157 is used in communications between the primary carrier and the user to identify the user. IMSI of primary carrier 157 may be encrypted with Ki of primary carrier 155.

Server 180 is used by FIG. 1A service provider to store the International Mobile Subscription Identity (IMSI) and Kis of multiple carriers. When referring to "server," 180 the specification discloses that the server 180 can include one or more servers running on one or more machines. The server 180 may provide a network of services. Although only one embodiment of the server 180 is shown in FIG. 1A, which includes only one computing device, the server 180 may have any number of servers and/or computing devices. Server 180 may communicate with wireless device 150 over network 120, which may include a wireless network and/or computer network.

Collection of IMSIs 181 is a collection of IMSIs of different carriers correlated with the Ki and carrier that uses the IMSI and Ki. In an embodiment, collection of IMSIs 181 may be a table, database, relational database, another data structure, and/or another method of storing the IMSIs and the relationship of each IMSI to the corresponding Ki and carrier.

The one or more IMSI's 182*a-d* and Ki's 183*a-d* are associated with one or more carriers 185*a-n*. The organization running the SIM will be referred to as the primary carrier or primary provider. The SIM initially may only have the IMSI and Ki of the primary carrier (any place the IMSI, Ki, or SIM "of the server" is referred to, it means the IMSI, Ki, or IMSI of the primary carrier, respectively). The user needs to have the IMSI and Ki for the carrier on the SIM in order to communicate with a given carrier. For example, the service provider may purchase service from multiple carriers. The user purchases a mobile device having a SIM provided by the organization running the server.

In an embodiment, the IMSI of the primary carrier 187 and the Ki of the primary carrier 189 are the IMSI and Ki of the primary carrier, which is the same as IMSI of primary carrier 157 and Ki of primary carrier 155.

Downloadable application 191 is an application stored at server 180 that users may download. Downloadable application 191 facilitates communicating with server 180. Downloadable application 191 includes machine instructions and optionally rendering information, which, when implemented by the user device, cause a particular page of the application that was requested by the user to be displayed on the user device. The downloadable application 191 (once installed at the user device) requests the server 180 to send additional information (e.g., dynamic information) that is not stored at the user device (e.g., wireless device 150), such as pricing information and information about carriers available at a given location. For example, downloadable application 191 may include instruction and/or rendering information for producing that static information on each page, instructions for requesting the dynamic information from the server 180, instructions for receiving the dynamic information from the server 180, and instructions for consuming the dynamic information from the server 180, and incorporating the dynamic information from the server into the page of the downloadable application 191 that was requested, so as to produce the dynamic information on the requested page. Even some of the information needed for producing portions of the dynamic information may be included in downloadable application 191. For example, a logo for a commonly available carrier may be stored within downloadable application 191 as part of downloadable application 191. When the user requests to view the page showing the available carriers and when the server 180 indicates that this particular commonly-available carrier is available, application 191 may retrieve the logo form a storage area on the user device and display the logo within a list of available carriers.

GUI 193 includes instructions for producing rendering information for rendering the pages of the user interface and may also store rendering information for static parts and/or other parts of the page. A user interacting with the server, via GUI 193 can request a page of GUI 193. Server 180 determines the appropriate rendering information (for both the dynamic and static parts of the page) for the page chosen, for the user device, and for the browser used by the user device. A browser at the user device consumes the rendering information and produces the requested webpage (GUI 193 differs from downloadable application 191 in that GUI 193 is stored at the server, and when using GUI 193, the server sends rendering information for rendering a page within a browser on the user device, whereas application 191 is stored on the user device and does not need a browser, but instead includes instructions for rendering the requested page and consuming information sent by the server for the information that is not known in advance, such as available carrier, current account information, and prices of available plans).

Figure 1B:
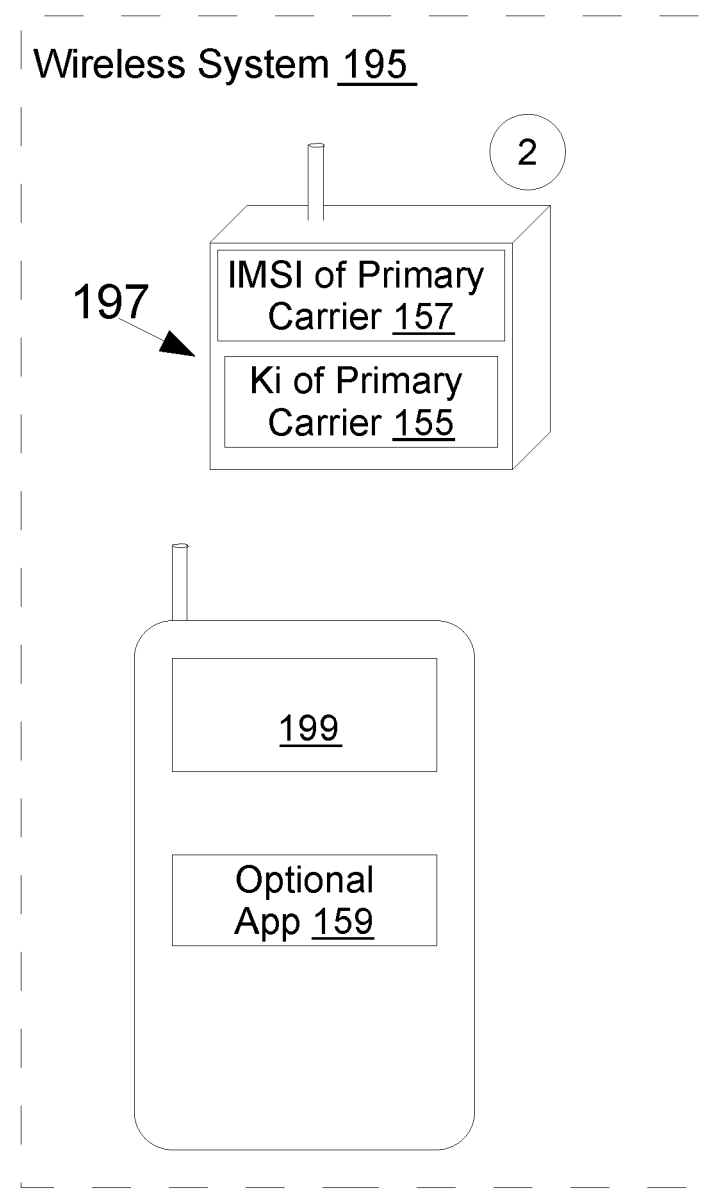
FIG. 1B shows a block diagram of an example of another embodiment of the user system of FIG. 1A.

FIG. 1B shows a block diagram of an example of wireless system 195. Wireless system 195 may include Ki of primary carrier 155, IMSI of primary carrier 157, application 159, portable router 197, and mobile phone 199. In other embodiment, the system 100 may not have all of the elements listed and/or may have other elements in addition to or instead of those listed.

Ki of primary carrier 155, IMSI of primary carrier 157, and application 159 were described in conjunction with FIG.

1A. Wireless system 195 may be an embodiment of wireless system 150. Portable router 197 includes a programmable SIM, which is capable of having IMSIs and Kis of one or more local carriers written to the programmable SIM, so that each time (if so desired) when the user changes locations, a new local carrier may be selected by downloading a new IMSI and Ki of another carrier. Mobile phone 199 communicates with portable router 197, which in turn communicates with one of local carrier 110*a-n* and/or server 180. Application 159 may be used for selecting a new local service, and/or for managing accounts with local servers. Alternatively, mobile phone 199 may communicate, via portable router 197, using GUI 193 to communicate with sever 180.

Figure 2A:
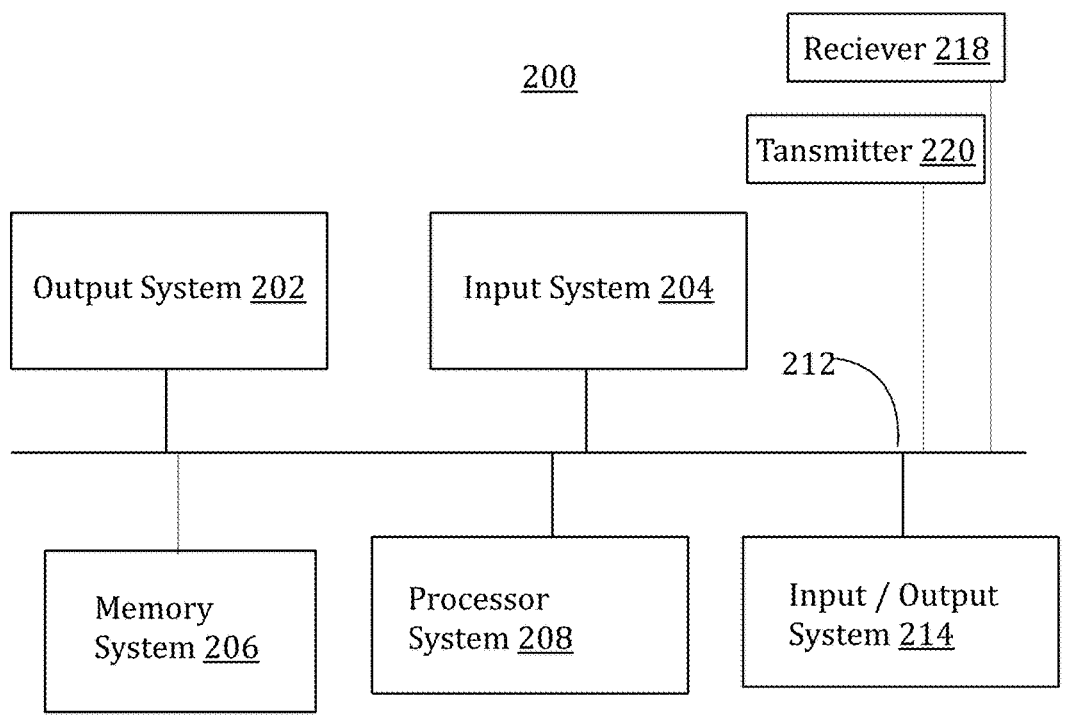
FIG. 2A shows a block diagram of an example of machine having wireless capabilities.

FIG. 2A shows a block diagram of a machine 200 having wireless capabilities. The machine 200 may include output system 202, input system 204, memory system 206, processor system 208, communications system 212, input/output device 214, receiver 218, and transmitter 220. In other embodiments, machine 200 may include additional components and/or may not include all of the components listed above.

Machine 200 is an example of a computer that may be used for server of FIG. 1A or the mobile device of the user.

Output system 202 may include any one of, some of, any combination of, or all of a monitor system, a handheld display system, a printer system, a speaker system, a connection or interface system to a sound system, an interface system to peripheral devices, a wireless transmitter and/or a connection and/or interface system to a computer system, intranet, and/or internet, for example.

Input system 204 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, a wireless receiver and/or internet (e.g., IrDA, USB), for example.

Memory system 206 may include, for example, any one of, some of, any combination of, or all of a long term storage system, such as a hard drive; a short term storage system, such as random access memory; a removable storage system, such as a floppy drive or a removable drive; and/or flash memory. Memory system 206 may include one or more machine-readable mediums that may store a variety of different types of information. The term machine-readable medium is used to refer to any non-transitory medium capable of carrying information that is readable by a machine. One example of a machine-readable medium is a non-transitory computer-readable medium. Another example of a machine-readable medium is paper having holes that are detected that trigger different mechanical, electrical, and/or logic responses.

If machine 200 is the user's mobile device, then memory system 206 may store the IMSI and Ki of the server and the IMSIs and Kis to which the user has purchased service from the server. Memory system 206 may include a decryption algorithm for decrypting the IMSI sent by the server with Ki of the server. If machine 200 is a server, memory system 206 may also store an algorithm for receiving a request from the user's machine for service, forming a list of local carriers, sending the list to the user, receiving a selection of a carrier, retrieving the IMSI and Ki of the selected carrier, and crediting the user account, for example. Memory 206 may store a graphical user interface that the user device interacts with when checking account information and/or ordering a new service. Alternatively or additionally, memory 206 may store a downloadable application that the user device downloads for communicating with the server (instead of using the graphical user interface).

If machine 200 is the server, then memory system 206 may also store a collection of IMSIs and Kis from a variety of carriers for the user to purchase. Memory 206 may include an encryption algorithm for encrypting the IMSI with the Ki of the server to send the encrypted IMSI to the user's mobile device.

If machine 200 is the user's device, memory system 206 may also store an algorithm for sending a request from the user's machine for service, receiving a list of local carriers, sending a selection of a carrier, purchasing service of the selected carrier, and receiving the IMSI and Ki of the selected carrier, for example. If machine 200 is the user's device, memory system 206 may store the application for interacting with the servers or may include instructions related to presenting a GUI for purchasing plans from many different carriers and interacting with the server of the primary carrier.

Processor system 208 may include any one of, some of, any combination of, or all of multiple parallel processors, a single processor, a system of processors having one or more central processors and/or one or more specialized processors dedicated to specific tasks. Processor system 208 implements the processes stored in memory system 206.

Communications system 212 communicatively links output system 202, input system 204, memory system 206, processor system 208, and/or input/output system 214 to each other. Communications system 212 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 214 may include devices that have the dual function as input and output devices. For example, input/output system 214 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 214 is optional, and may be used in addition to or in place of output system 202 and/or input device 204.

Receiver 218 and transmitter 220 receive and transmit, respectively, wireless signals. Receiver 218 and transmitter 220 may be part of output system 202, input system 204, and/or input/output system 216. Although a separate receiver and transmitter are shown, in an alternative embodiment, a transceiver may be used instead.

Figure 2B:
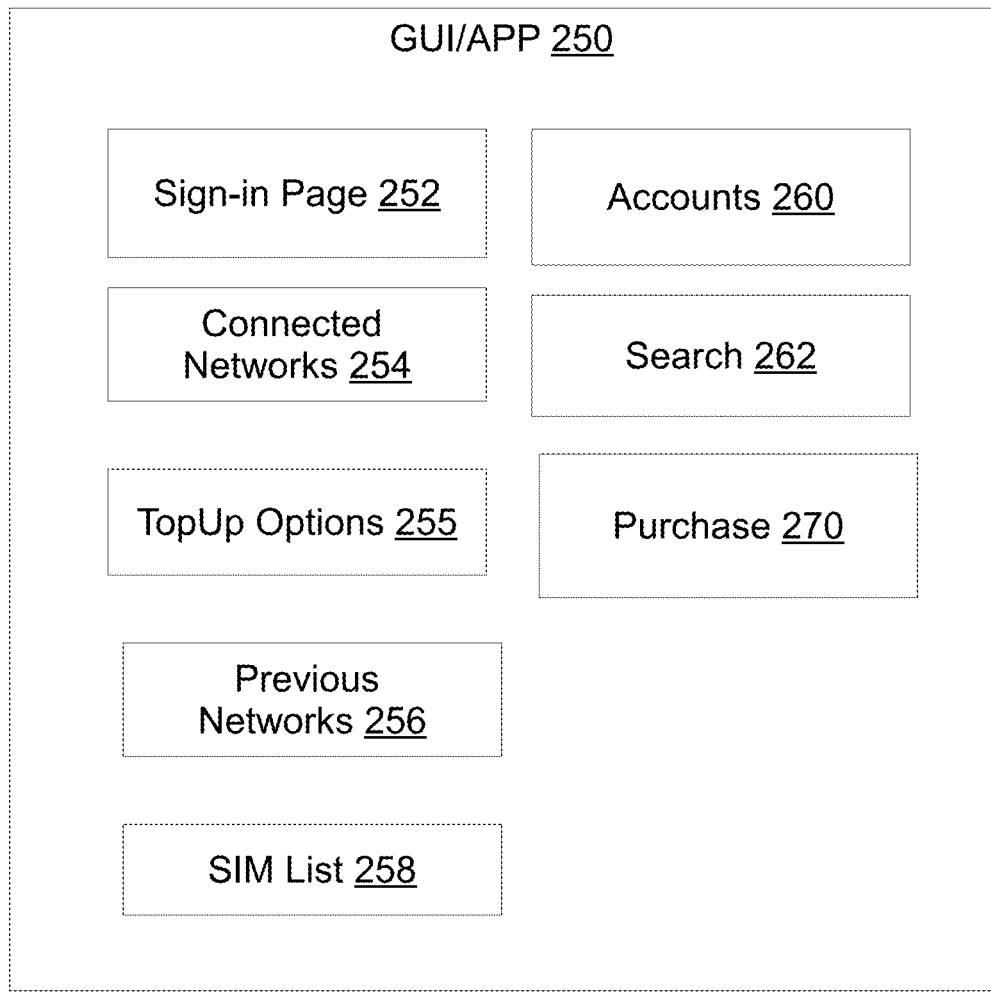
FIG. 2B shows a block diagram of functions carried out by the machine having wireless capabilities.

FIG. 2B shows a block diagram of modules 250 carried out by the machine having wireless capabilities. The modules 250 may include sign-in page 252, connected networks 254, top up options 255, previous networks 256, SIM list 258, accounts 260, search 262, and purchases 270. In other embodiments, modules 250 may include additional components and/or may not include all of the components listed above.

Modules 250 are examples of different modules that may be associated for carrying out various functions associated downloadable app191 and/or GUI 193. Each element of modules 250 may include one or more machine instructions that are stored at user device 150 and/or server 180.

The sign-in page 252 functions to sign the user into the network. The sign-in page 252 may include functions and/or spaces for signing in, such as email or username and password. The sign-in page 252 may also include hints about the username and/or password. The sign-in page 252 may also include a link to activate if the user does not remember the username or password.

Connected networks 254 identify which local networks the user is connected to and may provide the user with information about the networks to which the user is connected.

Top up options 255 identifies which accounts the user may add more time, data, and/or other services. Top up options 255 provides the user with a list of the accounts, and indicates to the user that the selections in the list are amounts by which the user may top-up (add more time or more of another consumable service) to the users account. In an embodiment, top up options may be replaced and/or supplemented with an option for adding more services or changing services of existing accounts.

Previous networks 256 identifies which networks the user was previously connected to and provides that information to the user (e.g., in a list form). The previous networks can also include information about where the previous networks operated, pricing, plans, time, dates, etc.

SIM list 258 identifies which SIMs the user has installed on particular devices, and may provides SIM information as a list to the user. In an embodiment, the use may select a SIM in the SIM list to see more information about the SIM, such as which carriers the SIM is compatible with and which devices have that SIM installed. By checking the SIM list, the user can determine whether, when the user signs up to a particular local service, the user will also need to download a new SIM to use that particular local service.

Accounts 260 identify which accounts the user has (with which networks) currently and/or past and provides the user with a list of accounts associated with different local carriers. The information may also include dates, prices, plans, locations for which service is available via that account, and/or other information associated with a particular account on at a particular local carrier.

Search 262 functions to allow the user to perform searches associated with the service provided by server 180. Search 262 may allow the user to search for carriers and/or plans available in a particular location.

Purchases 270 functions to identify any purchases the user has made in the past and allow the user to make new purchases. Purchases 270 may provide the user with an interface for entering payment information (such as the credit card and/or bank account information from which the payment is made), view the total of the services that the user desires to purchase and/or top up, a method of confirming the purchases before performing the purchases, and a method of performing the purchase. In this specification, the term transaction is generic to a purchase and the term transaction may be substituted for the word purchase to obtain other embodiments.

Figure 2C:
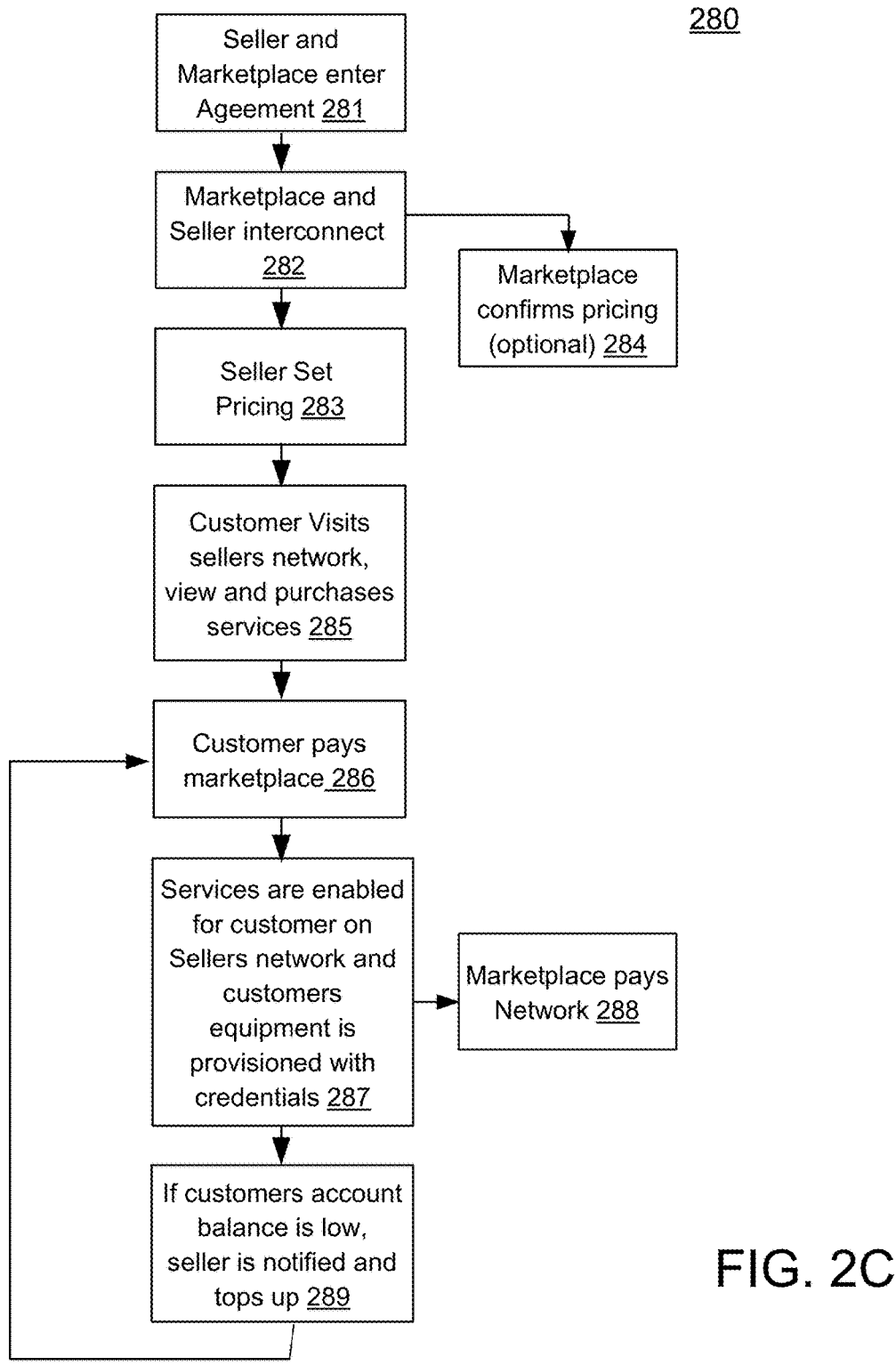
FIG. 2C shows a flowchart of an embodiment of a method of implementing a market place for selling plans of carriers.

FIG. 2C shows a flowchart of an embodiment of a method 280 for enrolling in the system from the perspective of a carrier/seller.

In step 281 the seller/carrier and marketplace provider/ primary global carrier enter into an agreement. The agreement may be for the carrier to be involved in the market place provider's service for providing prepaid data plans, for providing global service/plans, etc. The agreement may involve the carrier issuing a set of IMSIs and Ki's that may be sent by the market place provider to a user that purchases service. The carrier may also be involved in a variety of ways. For example, the carrier may buy advertisement time, the carrier may pay to be listed when a user searches for a carrier in a specific location, etc. The market place provider may purchase services from the carrier, which may be resold to the user. Alternatively, or additionally, the carrier may pay for any one of or all of the services the marketplace/market place provider provides. The agreement may result in the carrier being enrolled in the service, at which time the carrier receives an account with the service/marketplace, so that plans of the carrier being offered in the marketplace.

In step 282, the marketplace and the seller interconnect. This may involve adding the seller t to the database and giving the seller the ability to set up plans and/or to edit plans that are available for the user rot purchase.

In step 283, the seller sets the pricing. The seller can decide on the pricing for one or more plans, for service in one or more locations, etc.

In step 284, optionally, the marketplace confirms the pricing. In at least one embodiment, the marketplace may want to have a say in one or more aspects of the pricing. The carrier may only set the price that the marketplace needs to the carrier, but the marketplace may decide on the final price for the service that is offered to the user.

In step 285, the customer visits the seller's network, and the customer views and purchases services. The customer can be any user. The customer can visit the network GUI and can decide on a plan, location, etc. that the customer wants to purchase. The customer can view a list of carriers and decide which carrier and/or plan the customer would like to purchase.

In step 286, the customer pays the marketplace. The customer sets up an account and/or pays the marketplace using any of a variety of methods. For example, the customer may pay via credit card. Alternatively, the customer may choose to be billed monthly for the service. Optionally, the customer may buy minutes, time, data, etc. for a short time period, such as, while the customer is in a particular location. In an embodiment, the carrier may only be listed in the marketplace when the carrier has an agreement with the marketplace. In other words, when the customer does a search for carriers in a particular location, if the carrier does not have an agreement with the marketplace, the carrier will not be listed in the marketplace.

In step 287, the services are enabled for the customer on the seller's network and the customer's equipment is provisioned with credentials. The method may involve server 180 sending an IMSI and Ki of the service being purchased, but encrypted with a Ki of another service, that the user already has. For example, if the user has service with ATT and is purchasing service India Votaphone, the user has ATT's Ki and IMSI but does not have India Votaphone's Ki and IMSI. So, server 180 sends the India Votaphone/s IMSI and Ki, but encrypts them with ATT's Ki.

In step 288, the marketplace pays the network. As part of the agreement, the marketplace may agree to pay the network/carrier a certain amount depending upon the number of customers the carrier obtains.

In step 289, if the customer's account balance is low, the seller is notified and tops up. Steps 281-289 continues. The customer buys a specific plan, number of minutes, MB, etc. Thus, when the balance of the minutes is low or the plan is close to the end date, the seller can be notified. The marketplace (global primary carrier) identifies which accounts the user may add more time, etc. to, provides the user with a list of the accounts, and indicates to the user that the selections in the list are amounts by which the user may top-up (add more time or more of another consumable service) to the users account.

In an embodiment, each of the steps of method 280 is a distinct step. In another embodiment, although depicted as distinct steps in FIG. 2C, step 281-289 may not be distinct steps. In other embodiments, method 280 may not have all of the above steps and/or may have other steps in addition to or instead of those listed above. The steps of method 280 may be performed in another order. Subsets of the steps listed above as part of method 280 may be used to form their own method.

Figure 3:
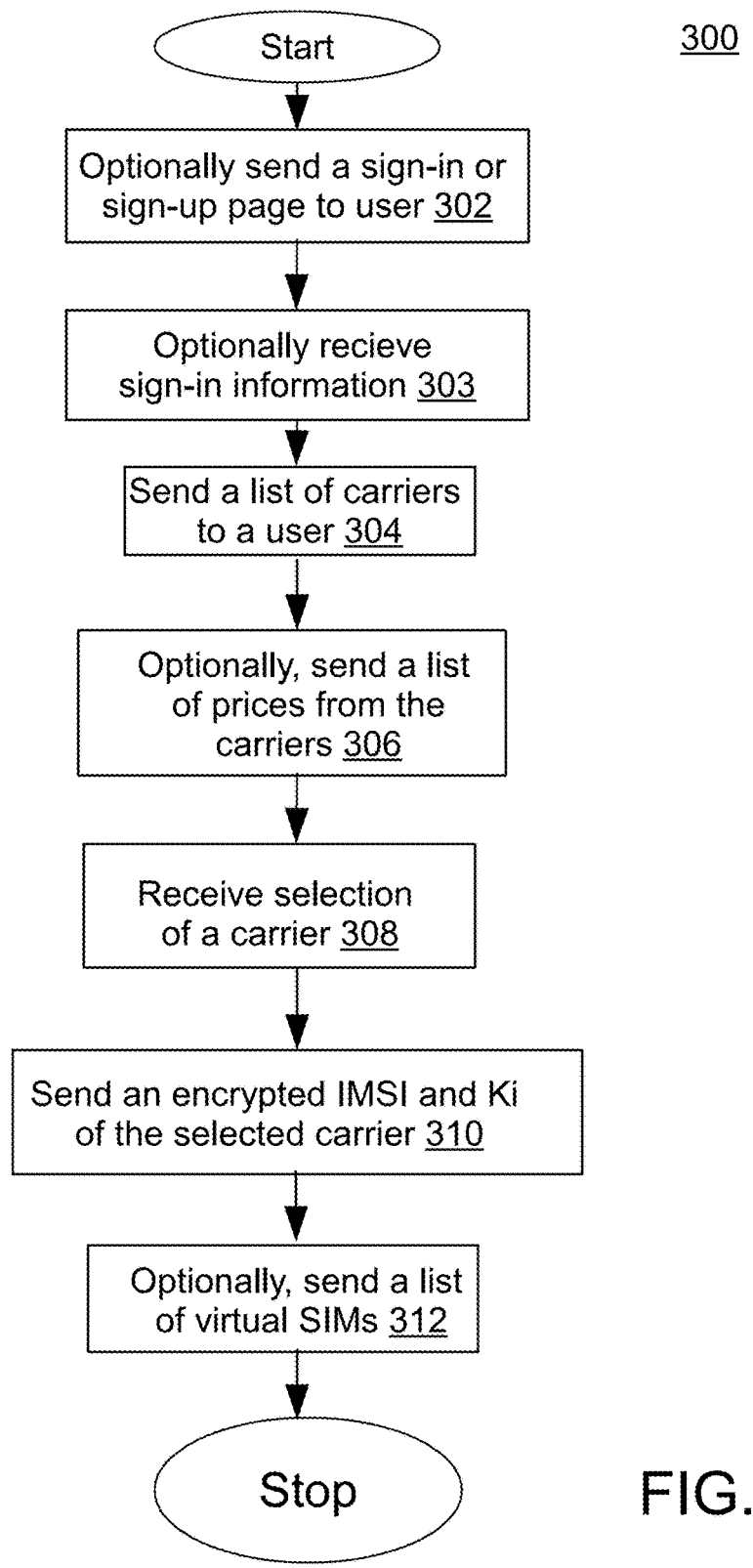
FIG. 3 shows a flowchart of an embodiment of a method for providing a wireless phone service in multiple locations that are not covered by the same phone service from the point of view of the server.

FIG. 3 shows a flowchart of an embodiment of method 300 for providing wireless phone service in multiple locations that are not covered by the same phone service. Method 300 is from the point of view of the server.

In step 302, the server receives a request from a user to sign-up or sign-in. The initial request (via the sign-up or sign-in), may be accomplished via any a routing network including the local mobile server systems, a local Wi-Fi network, or a local WiMax network, for example. In an embodiment in which an unsubscribed-to network is used to initially gain a new subscription, in some cases the user or the carrier associated with server 180 may pay roaming charges to connect the user to the server 180. Alternatively, the wireless device 150 may use other channels to establish a subscription including but not limited to, a local hotspot (such as wi-fi service available in an airline terminal, hotel, or café), unstructured supplementary data ("USSD") protocols, short message service ("SMS") protocols with a roaming profile, or other Internet protocol ("IP") Internet protocol communication channels, for example.

In step 303, the server 180 receives the user information and authenticates the user information.

In step 304, the server 180 sends a list of carriers to a user (e.g., an end-user). In the specification the words "user" and "end-user" will be used interchangeably to mean the person who is obtaining the wireless service. Specifically, in this specification, the term user is generic to the term end-user, and the two terms may be substituted one for another to obtain different embodiments. Upon receiving a message from the user, the server determines a list of carriers that provide service in the local area. The server sends the list to the mobile device. For example, if the user is in Bangal, India, the user may do a search for carriers in Bangal, India (see FIG. 11). From the list, the user may activate a link for the carrier the user is interested in purchasing a plan from. The link may take the user to a page containing more information about the carrier and/or plans provided by the carrier.

In step 306, if the user activates a link requesting the information, the server 180 optionally sends a list of prices and/or plans from the carriers to the user. The list may be sent without activation by the user. Alternatively, a plan may be chosen using information presented by the user previously.

In step 308, the server 180 receives a selection of a carrier from the user (e.g., via wireless device 150). The selection may include a request to purchase the service and/or a specific plan of one of the carriers 110*a-n*.

In step 310, the server 180 sends an encrypted IMSI and Ki of the selected carrier to the user phone (e.g., wireless device 150). The server then encrypts the IMSI and the Ki of the carrier selected with the Ki of the server, and sends the encrypted IMSI and Ki to the mobile device of the user. Wireless device 150 decrypts the IMSI and Ki of the carrier using the Ki of the server. Wireless device 150 then installs the IMSI and Ki of the carrier in the SIM of wireless device 150, allowing the user to use the wireless service provide by the local carrier that the user selected.

In step 312, the server 180 may optionally send a list of the user's SIMs to the user (alternatively, the user may store a local list of SIMs in one of the user's devices, such as wireless device 150 or mobile router 197). In an embodiment step 312 is performed if the user requests to see the SIM list.

In an embodiment, each of the steps of method 300 is a distinct step. In another embodiment, although depicted as distinct steps in FIG. 3, step 302-312 may not be distinct steps. In other embodiments, method 300 may not have all of the above steps and/or may have other steps in addition to or instead of those listed above. The steps of method 300 may be performed in another order. Subsets of the steps listed above as part of method 300 may be used to form their own method.

Figure 4A:
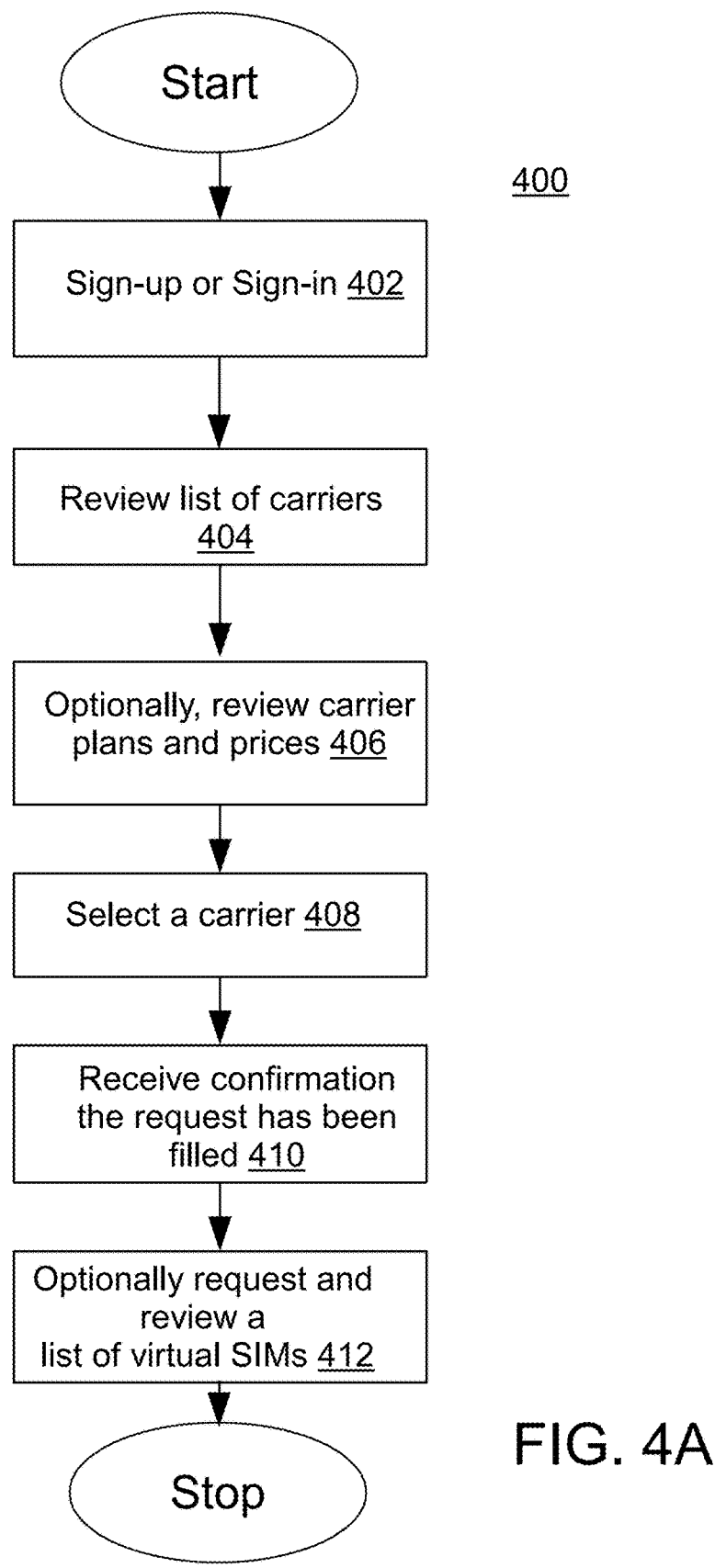
FIG. 4A shows a flowchart of an embodiment of a method for providing a wireless phone service in multiple locations that are not covered by the same phone service from the point of view of the end-user.

FIG. 4A shows a flowchart of an embodiment of method 400 for providing a wireless phone service in multiple locations that are not covered by the same phone service. Method 400 is from the point of view of the end-user.

Whenever the user travels to a location at which the user does not currently have service with any local service provider, the user may wirelessly send a request to server 180 to purchase service of one of local carriers 110*a-n* that provides service in the locality of interest.

In step 402, the user may sign up or sign in to the service provided by server 180. For example and without limitation, signing up or signing in may include setting up an account and/or entering the user's information in a database. Information such as name, email, job title, telephone number(s), cell number(s), address, and other user information (e.g., family) may also be taken. The user that signs up or signs in can be the end-user. The initial request (via the sign-up or sign-in), may be accomplished via any routing network including the local mobile server systems, a local Wi-Fi network, or a local WiMax network, for example. In an embodiment in which an unsubscribed-to network is used to initially gain a new subscription, the user may have to pay roaming charges to connect to the server. Alternatively, the wireless device may use other channels to establish a subscription including, a local hotspot (such as wi-fi service available in an airline terminal, hotel, or café), unstructured supplementary data ("USSD") protocols, short message service ("SMS") protocols with a roaming profile, or other Internet protocol ("IP") Internet protocol communication channels, for example.

In step 404, the user requests a list of carriers that service a particular location. For example, the user may want a list of carriers for a country the user is or will be visiting, such as India, or the UK (below pages are discussed see FIG. 11 and FIG. 12, which show examples of pages showing services available in India and the UK, respectively, FIG. 11 and FIG. 12). The list of carriers may be accompanied by other information, such as the popularity of the carrier, a rating of the carrier, the expense of the carrier, an icon having a logo representing the carrier, plan details, etc. The list of carriers may also include a link that allows the user to access more information about the carrier and/or the various plans for that region. The list of carriers is reviewed by the end-user.

In step 406, the end-user can optionally review the carrier's plans and prices before deciding and/or paying by accessing a link provided in the list of carriers and/or after choosing a specific carrier. In one embodiment, the user may select the best value for a local network based on preferences created by the user or based on preprogrammed defaults. In an alternative embodiment, the user may select the plan that best suits the user's needs. For instance, there may be a plan that lasts for a month and costs $300 and allows for the use of 100 minutes of cell phone time and 3 gigabytes of data. Another plan may offer only a week of coverage with 25 gigabytes of data and 200 minutes of talk time and only cost $75. If the person will only be in the location for a week or if the person requires more talk time or data transfer services, the latter plan may be better.

In step 408, the end-user can select a carrier, and send the selection to server 180 as a request for a carrier. For example, the user may have carriers for a number of areas (e.g., the user may have NTT Docomo for Japan, SingTel for Singapore, and AT&T for USA).

In step 410, the end-user receives a confirmation that the request has been fulfilled.

In step 412, the end-user can optionally request and review a list of SIMs that the user has already downloaded.

In an embodiment, each of the steps of method 400 is a distinct step. In another embodiment, although depicted as distinct steps in FIG. 4A, step 402-412 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

Figure 4B:
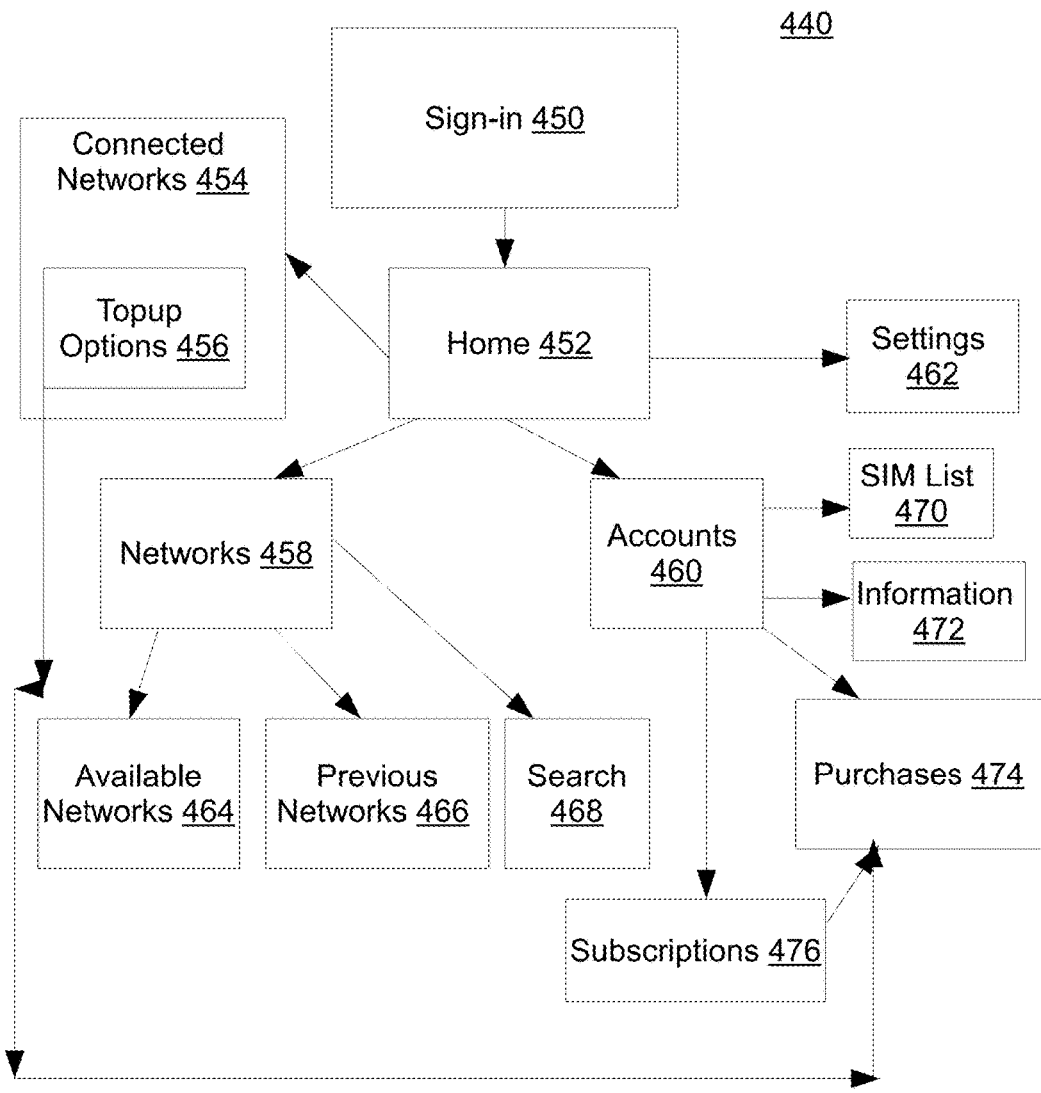
FIG. 4B shows a graph of an embodiment of how the pages of the application or graphical user interface of the global service provider of FIG. 1A are connected to one another.

FIG. 4B shows a graph 440 of links showing how the pages of Application 191 and/or GUI 193 are connected to one another. The graph 440 may include sign-in page 450, home 452, connected networks 454 including top up options 456, networks 458, accounts 460, settings 462, available networks 464, previous networks 466, search 468, SIM list 470, information 472, purchases 474, and subscriptions 476. In other embodiments, graph 440 may include additional components and/or may not include all of the components listed above.

Sign-in page 450 functions to allow the user to sign-in. Sign-in page 450 includes connections to home page (see also FIG. 2B, sign-in page 252 and FIGS. 3 and 4A). Sign-in page 450 may also include links/connections to a network page and/or settings page.

The home page 452 may be accessed from the sign-in page 450. Home page 452 has connections to at least settings page, accounts page, networks page, and connected networks page. Home page 452 is a root node for all of the other pages other than sign-in page 450. In an embodiment, although not shown in graph 450 all of other pages or most other pages include a link via which the user may return to home page 452.

The connected networks page 454 can be accessed from the home page 452. Connected networks page 454 displays the networks to which the user is currently connected to. Connected networks page 454 may includes top up options 456, which may be used to top up or add to services already purchased. Top up options 456 may be replaced with or supplemented with options to add or alter services that were already purchased.

The networks page 458 can be accessed from the home page 452. Networks page 458 functions to provide the user with useful information about current, past and potential networks for one or more locations. Networks page 458 includes connections/links to available networks, previous networks, and search pages. Networks page 458 may also include connections to home page and settings page. In an embodiment, all pages of most pages other than the sign-in page include a link to networks page 458.

The accounts page 460 can be accessed from the home page 452. Accounts 460 functions to provide the user with information about all of the user's current and past accounts. Accounts page 460 may contain connections/links to subscriptions page, purchases page, information page, an SIM list page. Accounts 460 may also include connections to home 450, networks 458 and settings 462. In an embodiment, all pages of most pages other than the sign-in page include a link to accounts page 458.

The settings page 462 can be accessed from the home page 452. Settings 462 functions to allow the user to set or change settings, such as the password for accessing the account on server 180, user name for the account on server 180, contact information, billing information, credit card information, information about the phone that the user uses for accessing server 180, information related to how often the user is billed, and/or maximum limits on service purchased, for example. Settings 462 may also include connections to home 452, networks 458, and/or accounts 460.

The available networks page 464 can be accessed from the networks page 458. Available networks 464 identifies and provides the user with a list of the available networks for a locations and/or all of the user's available networks. Available networks 464 may also include connections to home 452, networks 458, accounts 460, and/or settings 462.

The previous networks page 466 can be accessed from the networks page 458. Previous networks 466 identifies and provides the user with a list of the available networks for a locations and/or all of the user's available networks. Previous networks 466 may also include connections to home 452, networks 458, accounts 460, and/or settings 462.

The search page 468 can be accessed from the networks page 458. Search 468 includes a search engine and a field for searching. Search 468 allows the user to search for networks, which may be searched for by location and/or other criteria. Search 468 may also include connections to home 452, networks 458, accounts 460, and/or settings 462.

The SIM list page 470 can be accessed from the accounts page 460. SIM list 470 identifies and provides the user with a list of SIMs that the user has installed. SIM list 470 may also include connections to home 452, networks 458, accounts 460, and/or settings 462.

The information page 472 can be accessed from the accounts page 460. Information 472 provides information about accounts and/or other parts of the services provided by server 180. Information page 472 may also include connections to home 452, networks 458, accounts 460, and/or settings 462.

The purchases page 474 can be accessed from the accounts page 460, subscriptions page 476, and top up options 456. Purchases 474 functions to identify past purchases and provide the user with a list. Purchases 474 may also provide functions that allow the user to make and/or confirm new purchases. Purchases 474 may also include connections to home 452, networks 458, accounts 460, settings 462, and/or purchases 474.

The subscriptions page 476 can be accessed from the accounts page 460. Subscriptions 476 identifies and provides the user with plans to which the user has subscribed. Subscriptions 476 may also include connections to home 450, networks 458, accounts 460, and/or settings 462.

FIGS. 5-13 are screenshots of an example of a graphical user interface for selecting between a variety of phone service providers and ordering phone service from any of a variety of carriers.

Figure 5:
FIG. 5 shows an embodiment of a sign-in/sign-up page for a service providing an online market place for purchasing service from a variety of carriers.

FIG. 5 shows a screenshot of an example of a sign-in/sign-up page 500, which has a button for signing in to the site for purchasing phone service directly or via a social network (e.g., Facebook) for an embodiment of a system for providing wireless phone service in multiple locations in which that are not all covered by the same phone service. The page 500 may include a title area 501, an information bar 505, a social media button 510, a sign-in button 520, a sign-up button 530, and an informational button 540. In other embodiment, the page 500 may not have all of the elements listed and/or may have other elements in addition to or instead of those listed.

Sign-in/sign-up page 500 is an embodiment of sign-in 252. Title area 501 functions to explain the purpose of the system. In FIG. 5, the title is "GIGSKY" to convey to the user that system 500 provides wireless phone service in multiple locations, such as globally. The title area 501 may also include a trademark, an explanation of the page, and/or an icon. The explanation can explain and/or introduce the function of the system in more detail than the title. For example, the explanation in FIG. 5 explains the page as "LOCAL IS THE NEW GLOBAL."

Telephone information 505 is the information, typically provided as a bar, that is specific to the telephone service provider. For example, the telephone information in FIG. 5 includes the name of the service provider (see "AT&T") that provides the wireless connection, an indication of the service level for the area by the number of bars, an indication that the service is available by a triangular icon, the time, and the amount of battery that is available (see "92%) next to a battery icon.

Social media button 510, when activated, allows the user to access the service provided by server 180 through a participating social media by clicking on the button or the arrowhead. Social media button may include the name and/or icon of the social media provider and an explanation of the use of the button (see "Sign in with Facebook"). In this specification, the terms "button" and "link" are used interchangeably to refer to an active portion of a page, which when selected cause an action to happen. The terms button and link may be substituted one or another throughout the specification to obtain different embodiments. Similarly the term to activate a button or link or select a button or link are used interchangeably and may be substituted one for another throughout the specification to obtain different embodiments.

Sign-in button 520, when activated (e.g., by clicking on the bar/button or the arrowhead), sends the user to a sign-in page. The sign-in page may include functions and/or spaces for signing in, such as email or username and password. The sign-in page may also include hints about the username and/or password. The sign-in page may also include a link to activate, if the user does not remember the username or password.

Sign-up button 530 is a button for signing up to the website and the service provided by the website for the first time. Sign-up button 530, when activated (e.g., by clicking on the bar/button or the arrowhead), sends the user to a sign-up page. The sign-up page may include functions and/or spaces for setting up the user's information in a database. Information such as name, email, job title, telephone number(s), cell number(s), address, and other user information (e.g., family) may be taken. A username, password, and security question may be chosen.

Informational button 540 is a button (e.g., the about Gigsky button) for viewing more information about the site of the primary global carrier and the service provided by the site of the primary global carrier. Information button can include an icon and/or a title (see "About Gigsky"). Information button, when activated, sends the user to a page (or pages) with more information about the services provided, but may also include links to other pages that allow the user to choose a carrier.

Figure 6:
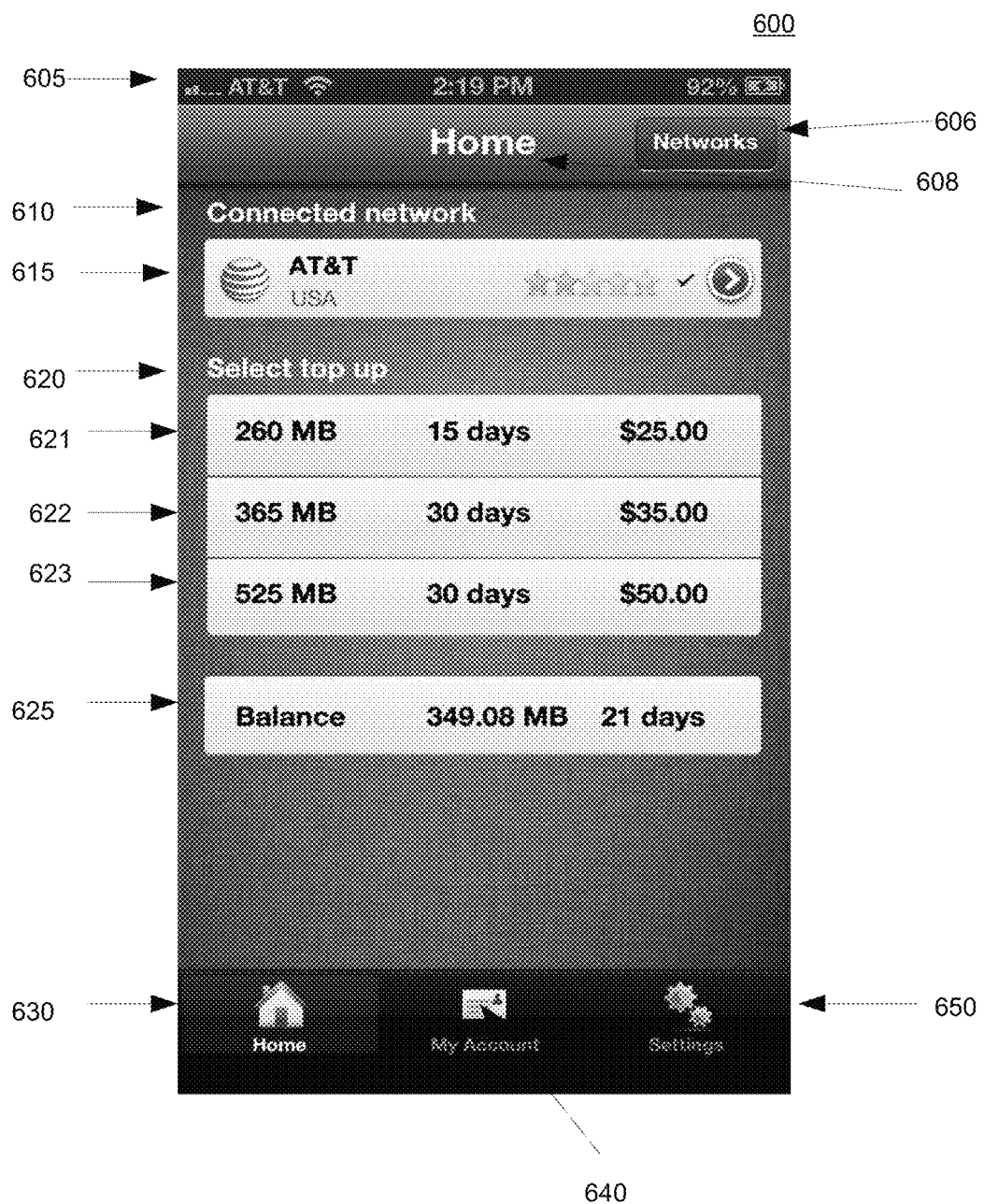
FIG. 6 shows a screenshot of an example of a page for adding time and/or data to a current plan.

FIG. 6 shows a screenshot of an example of a home page 600 for adding time and/or data to a current plan. The home page 600 may include a information bar 605, a networks button 606, a webpage title 608, a carrier information title 610, a carrier information button 615, a carrier plan title 620, one or more carrier plan buttons 621, 622 and 623, a balance button 625, a home link 630, a my account link 640 and a settings link 650. In other embodiments, the page 600 may not have all of the elements listed and/or may have other elements in addition to or instead of those listed.

Home page 600 may be an embodiment of home 452 (FIG. 4B). Information bar 605 has been discussed with reference to FIG. 5 as information bar 505.

Networks button 606 functions to send the user to the networks webpage where the user can find out more about the user's current and prior networks (a network page will be discussed below in conjunction with FIG. 7).

Page title 608 provides the title of the webpage. The page title 608 in FIG. 6 is "Home." Indicating that the page is a home page for the application or GUI. Page title 608 may also include some information about the webpage in addition to the title. Page title 608 may also include an icon to indicate the provider of the system (e.g., Gigsky).

Carrier information title 610 provides an indication of the use of that section of the page, which in FIG. 6 is for carrier information. In FIG. 6, the area of the page provides information about which network is current connected at that time and location. Specifically, the carrier information displays information about a local carrier to which the user is currently connected to and/or about the primary local carrier for which the user's wireless device was configured for at the time of manufacture.

Carrier information button 615 provides more information about the connected network and may include a link that allows the user to go to the homepage of the network. The carrier information button 615 may also include an icon, the country of origin, an indication of the rating of the carrier (e.g., 5 stars), an indication as to whether the carrier is activated (e.g., via the present or absence of a checkmark), and a link to more information about the carrier. The link button can be accessed by clicking on the arrowhead, clicking on the name of the carrier, or clicking on the window (the rectangular white area in FIG. 6). Optionally, the link for more information may include options for altering the service provided by the connected carrier and/or may bring the user to the website of the connected carrier. For example, the carrier indicated in FIG. 6 is AT&T, the country is the USA, the rating of the carrier is 5 stars, a checkmark is present to indicate that the carrier is active, and the arrowhead link button is present for the user to click on to see more information about the connected carrier.

The carrier plan title 620 indicates the use of the section below the title. The carrier plan title in FIG. 6 is "Select top up" which indicates that the selections below are amounts by which the user may top-up (add more time, bandwidth, and/or more of another consumable service) to the users account. In the example of FIG. 6, three options are shown for USA as option buttons 621, 622 and 623. The option buttons, when selected, cause the corresponding service for the connected network to be purchased, added a shopping cart for purchasing later, or bring the user to a page for purchasing the selected service. Buttons 621, 622, and 623 add an amount of phone time, in increments of number of days that are added to the plan, the price for adding that amount of time, rating, price/minute, amount of data (megabytes—MB), and type of usage, In the example of FIG. 6 top-up 621 adds 260 MB, for 15 days to the connected service, at $25.00; top-up 622 adds 365 MB for 30 days to the connected service, at $35.00; and top-up 623 adds 525 MB for 30 days to the connected service at $50.00. The top-up buttons (621, 622, and 623) may also function as links to one or more pages that provide more information about the services being topped up and/or more top-up options. The top-up buttons (621, 622, and 623) may also function to allow the user to purchase additional service to add to a plan by activating the link. Activation of the link may take the user to a purchase page.

The balance button 625 indicates the amount of time left in the plan (e.g., 21 days) and the amount of data that the user can still upload and/or download (e.g., 349.08 MB) for the current carrier. The balance is the amount of unused bandwidth (e.g., data) remaining that the user may use and/or the number of days left in the plan (e.g., 21 days).

Home link 630 provides a link to the user's homepage. The homepage may be the page that provides the telephone user with all of the functions the user can perform with the telephone (e.g., the telephone homepage). In a graph of the pages of the GUI or application, in which the pages are nodes of the graph, the home page is a root node for other pages. In the screenshot of FIG. 6, home link 630 is selected.

My account link 640 provides a link to the user's account page. The account page provides the user with information about the user's account, including but not limited to, the SIM list, subscriptions, purchases, and other information. An example of an account page will be discussed below in conjunction with FIG. 8.

Settings link 650 provides a link to the settings information for the telephone. For example, settings may include settings for interacting with data storage services and/or social media. The settings may include user name, password, port values for interacting with another server, via server 180. Other settings that may be accessed via settings link 650, were discussed in conjunction with settings 462 (FIG. 4B).

Figure 7:
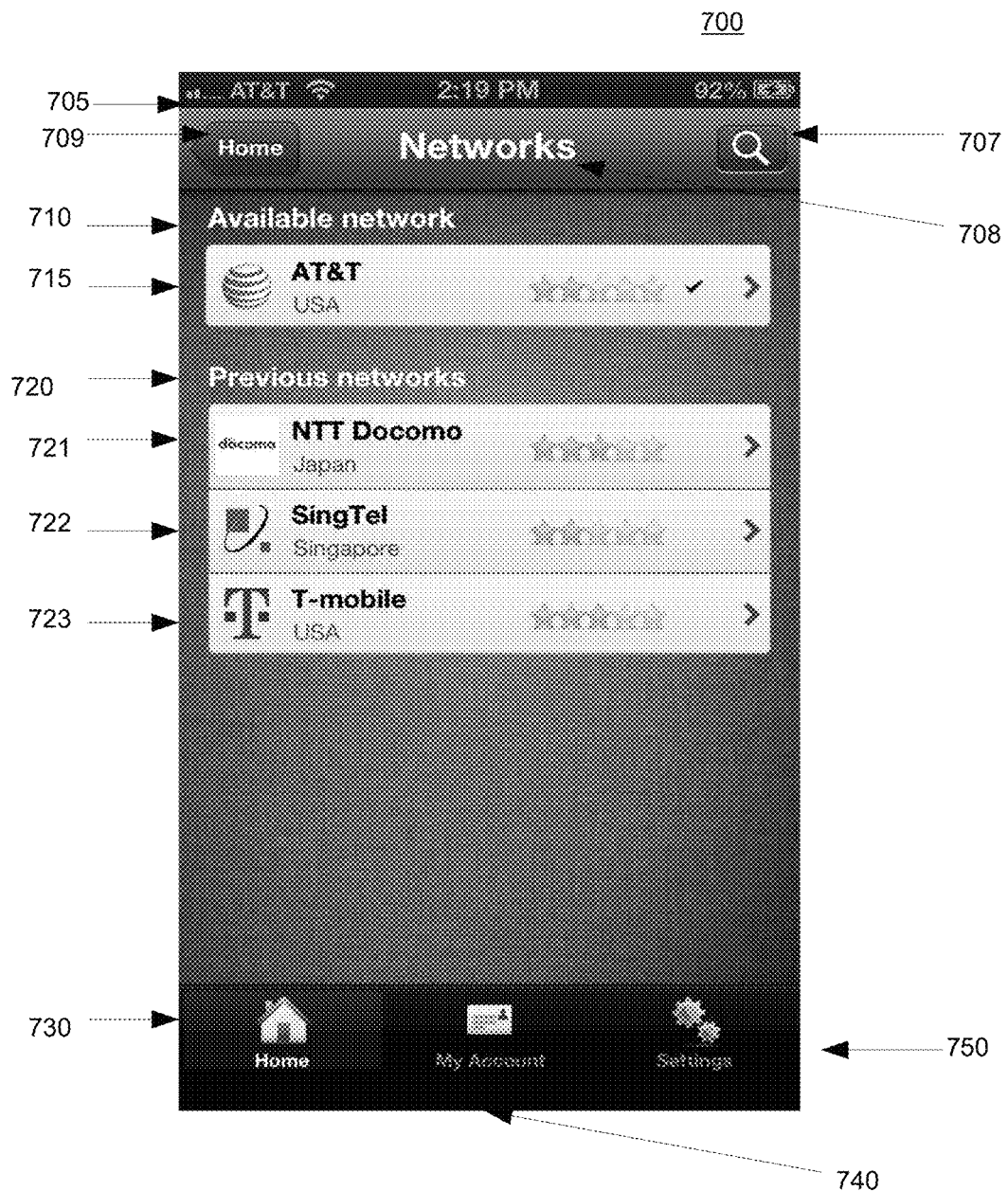
FIG. 7 shows a screenshot of an example of a page listing a current available carrier and previous networks that the user previously subscribed.

FIG. 7 shows a screenshot of an example of a network page 700. The page 700 may include an information bar 705, a search link 707, a page title 708, a home button 709, a carrier information title 710, a carrier information button 715, a previous networks title 720, one or more previous networks buttons 721, 722 and 723, a home link 730, a my account link 740 and a settings link 750. In other embodiments, the network page 700 may not have all of the elements listed and/or may have other elements in addition to or instead of those listed.

Network page 700 is an embodiment of networks 458 (FIG. 4B). In an embodiment network page 700 lists a current available carrier and previous networks (networks/ carriers that the user previously subscribed to). Upon selecting network button 606 the user is brought to network page 700. Information bar 705, carrier information title 710, and carrier information button 715 are embodiments of information bar 605, carrier information title 610, and carrier information button 615, respectively, which were discussed in conjunction with FIG. 6.

The search link 707, when activated, sends the user to a search page (which will be discussed further in conjunction with FIG. 11). The search link 707 may include textual information about the function of the button/link or an icon (e.g., a magnifying glass). The search page may provide the user with a search engine to identify which carriers operate in a given area, such as a given country and/or which carriers meet other characteristics, such as are within a certain price range.

The page title 708 provides the title of the page. The page title 708 in FIG. 7 is "Networks," indicating that information about networks that offer service will be displayed on the page. Page title 708 may also include some information about the webpage in addition to the title. Page title 708 may also include an icon to indicate the function of the page.

The home button 709, when activated, sends the user back to the home page of the GUI or application. The home page for the system may provide information about the current carrier, the plan, the balance, and may provide access to other pages associated with the GUI or application and/or with the telephone carrier. An example of a home page is provided in FIG. 6.

Previous networks title 720 provides a listing of, and links for, carriers to which the user was previously subscribed, which may or may not be currently available. In an embodiment the previous networks may be networks that are currently available in the location of interest.

One or more previous networks buttons 721, 722 and 723 provide a listing of, and link for, previous networks to which the user previously subscribed. Selecting one of the previous networks bring the user to a page where the user may purchase a subscription to the previous network. In FIG. 7, on the right side of the icon for each carrier is a link for subscribing to that carrier (see arrowhead).

Home link 730, my account link 740 and settings link 750 are embodiments of home link 630, my account link 640 and settings link 650, respectively, which have been discussed with respect to reference to FIG. 6.

Figure 8:
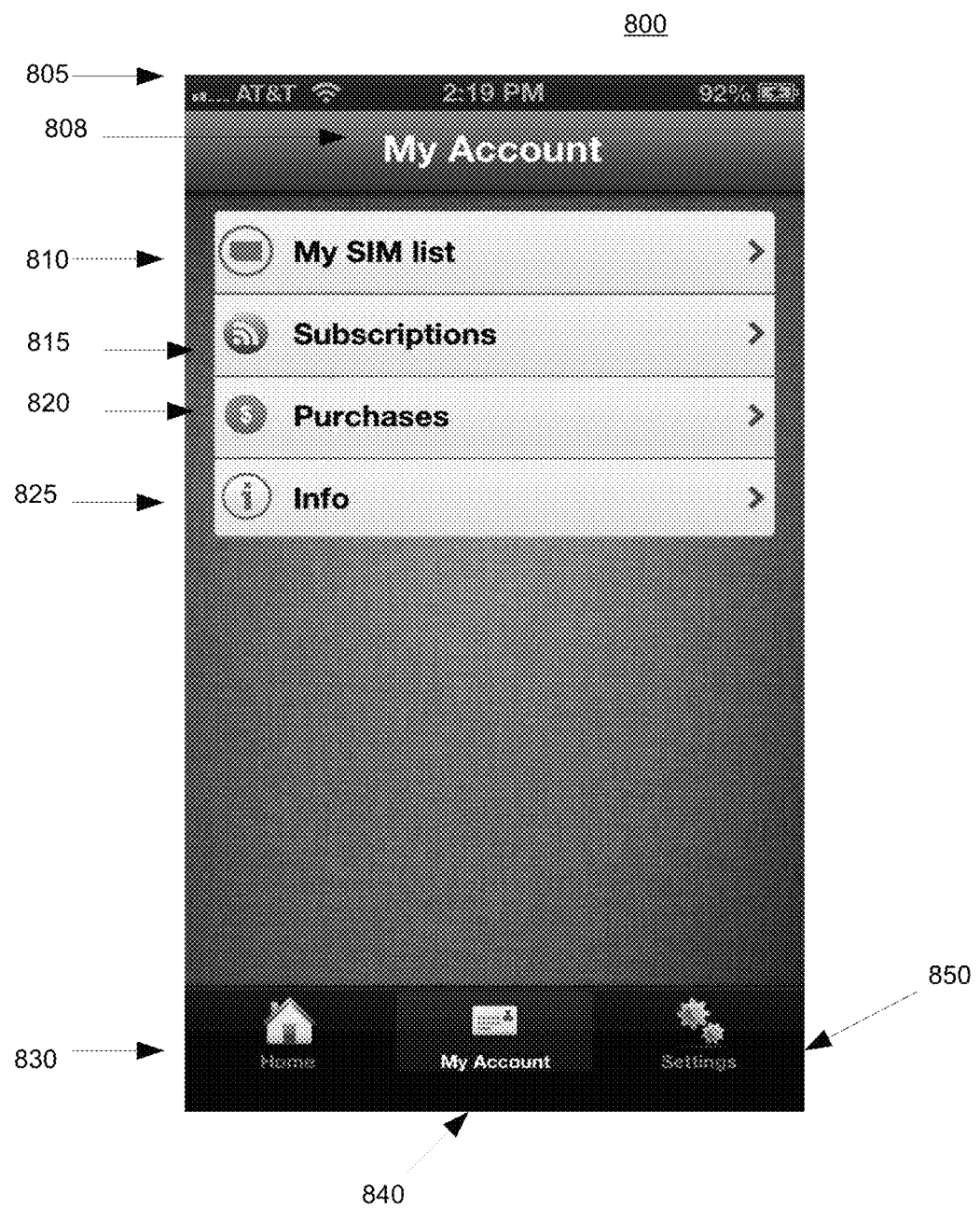
FIG. 8 shows a screenshot of an example of an accounts page for navigating between some options that are available to the user related to the user's accounts.

FIG. 8 shows a screenshot of an example of an accounts page 800. Accounts page 800 may include a information bar 805, a my account title 808, a my SIM list button 810, a subscriptions button 815, a purchases button 820, an info button 825, a home link 830, a my account link 840 and a settings link 850. In other embodiments, the page 800 may not have all of the elements listed and/or may have other elements in addition to or instead of those listed.

Accounts page 800 may be an embodiment of accounts 460 (FIG. 4B). The account page 800 is used for navigating between different options that are available to the user. Accounts page 800 is for navigating between some options that are available to the user with regard to the system for providing wireless service in multiple locations. Information bar 805 is an embodiment of information bar 605, which was discussed with reference to FIG. 6. information bar.

My account title 808 provides the title of the page. The page title 808 in FIG. 8 is "My Account," Indicating that information about the user's account is included on the page. Page title 808 may also include some information about the webpage in addition to the title. Page title 808 may also include an icon to indicate the function of the webpage.

My SIM list button 810, when activated, brings the user to a page for viewing the SIMs that the user already has and/or has installed in the user's phone (the SIM list will be discussed further in conjunction with FIG. 9). When the user needs a new SIM (that is a new IMSI and Ki) for a new carrier, a virtual new SIM (the new IMSI and new Ki) may be installed onto the user's mobile device seamlessly, without explicit input from the user, as part of purchasing the service for the new carrier.

Subscriptions button 815 is a link for viewing the user's subscriptions (a subscriptions page will be discussed in conjunction with FIG. 10).

Purchases button 820 is a link for purchasing services from a variety of carriers (a purchases page will be discussed below in conjunction with FIG. 13).

Info button 825, when activated, sends the user to a page containing more information about functions available, via function page 800. Info button 825 may include an explanation of what a SIM is. Info button 825 may include an explanation of what an IMSI is.

Home link 830, my account link 840 and settings link 850 are embodiments of home link 630, my account link 640 and settings link 650, which have been discussed in conjunction with reference to FIG. 6.

Figure 9:
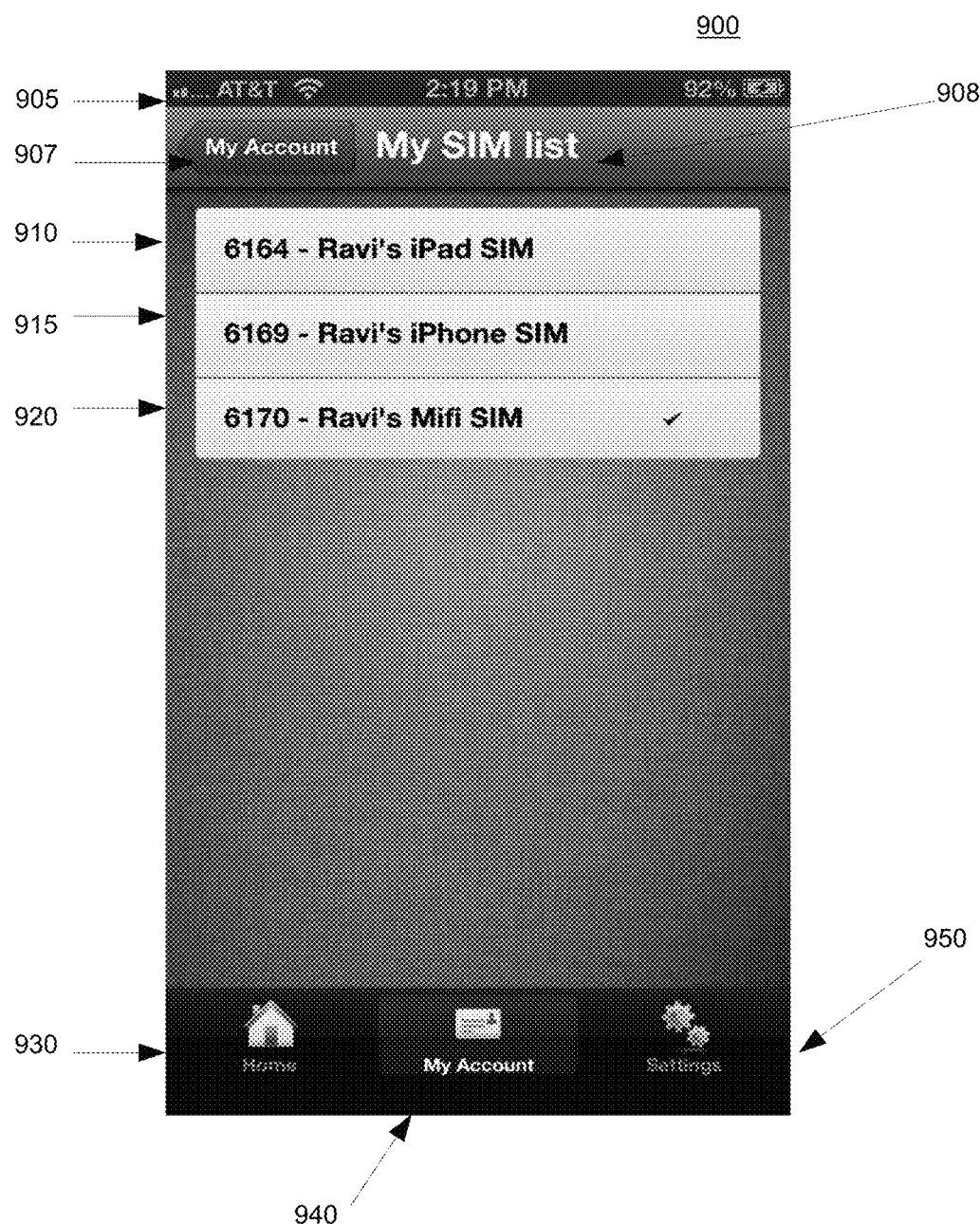
FIG. 9 shows an example of a screenshot of a page that lists the user's installed SIMs.

FIG. 9 shows an example of a screenshot of a SIMs page 900 that lists the users SIMS and the SIMs that are available in the area that the user is in. The page 900 may include a information bar 905, a my account button 907, a my SIM list title 908, a list of SIM's 910, 915, and 920, a home link 930, a my account link 940 and a settings link 950. In other embodiments, the page 900 may not have all of the elements listed and/or may have other elements in addition to or instead of those listed.

SIMs page 900 lists the SIMS came with the user's devices and/or the SIMs that has downloaded. SIM page 900 is an embodiment of SIM list 470 (FIG. 4B).

Information bar 905 is an embodiment of information bar 605, which was discussed with reference to FIG. 6.

My account button 907 functions to take the user back to the user's account information page (see FIG. 8).

My SIM list title 908 provides the title of the page. The page title 908 in FIG. 9 is "My SIM list," to indicate that the SIMs of the user are listed below. Page title 908 may also include some information about the page in addition to the title. Page title 908 may also include an icon to indicate the function of the page.

In an embodiment, list of SIMs 910, 915, and 920, together, provides a list of the specific SIMs that are installed. The buttons (or links) associated with SIMs 910, 915, and 920 are available as activate-able links to pages with more information about the SIM selected. The SIM's provided in FIG. 9 include (1) 6164—Ravi's iPad, SIM 910, (2) 6169—Ravi's iPhone SIM 915, and (3) 6170—Ravi's Mifi SIM 920, which is a link to information about the SIM on Ravi's iPad, the SIM on Ravi's iPhone, and the SIM on a device, referred to as "Mifi," respectively. Each link has an indication as to whether the SIM is available and/or currently in use, as indicated by the checkmark next to the SIM button 920, Mifi SIM.

Home link 930, my account link 940 and settings link 950 are embodiment of home link 630, my account link 640 and settings link 650, respectively, which were discussed with reference to FIG. 6 as.

Figure 10:
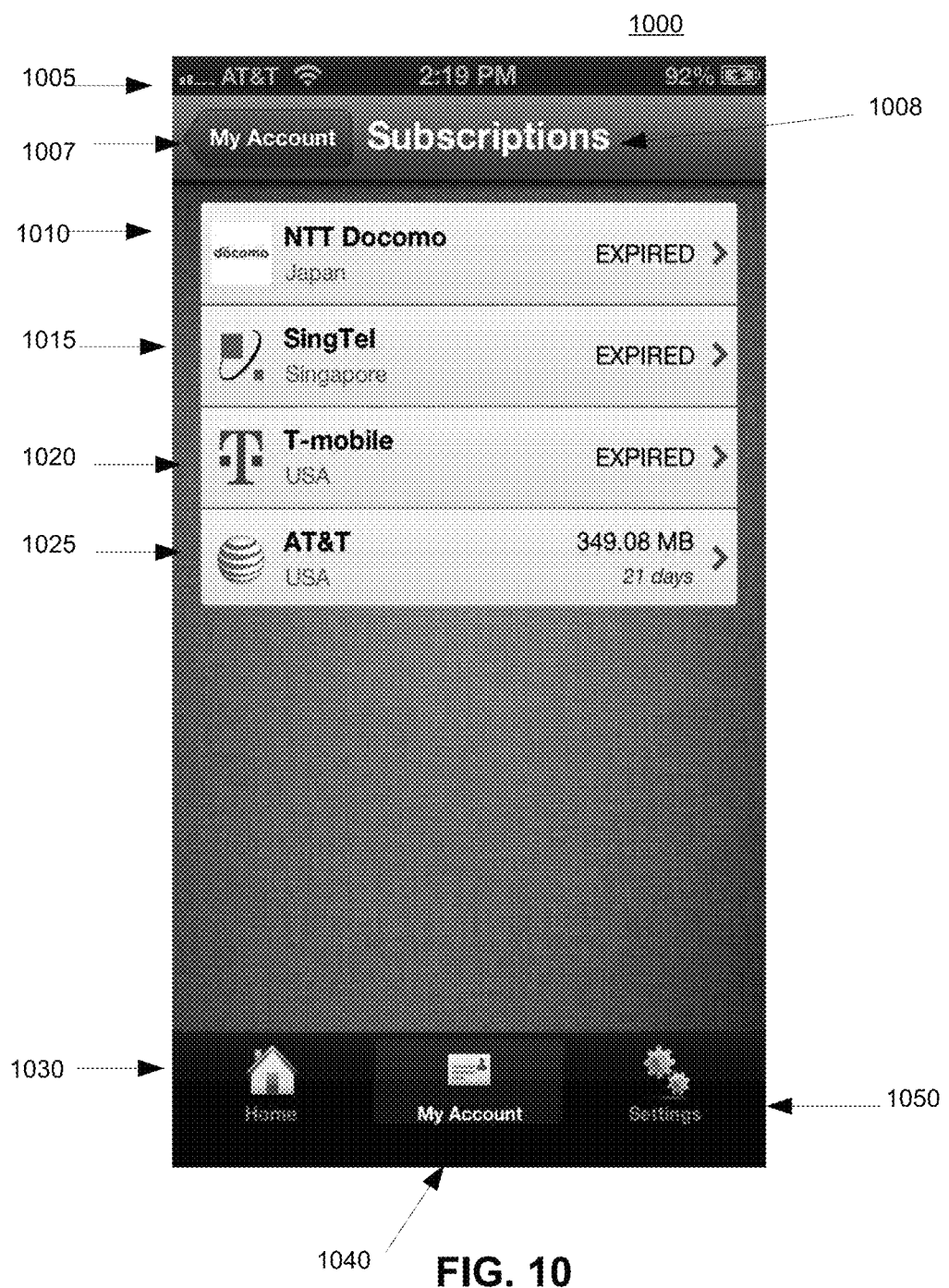
FIG. 10 shows an example of a screenshot of a page that lists the user's subscriptions and the statuses of the subscriptions.

FIG. 10 shows an example of a screenshot of a subscriptions page 1000. The subscription page 1000 may include a information bar 1005, a my account button 1007, a subscriptions title 1008, a list of subscriptions 1010, 1015, 1020, and 1025, a home link 1030, a my account link 1040 and a settings link 1050. In other embodiments, the subscription page 1000 may not have all of the elements listed and/or may have other elements in addition to or instead of those listed.

Subscriptions page 1000 lists the user's subscriptions and the statuses of the user's subscriptions. Subscriptions page 1000 is an embodiment of subscriptions 476 (FIG. 4B).

Information bar 1005 and my account button 1007 are embodiments of FIGS. 6 and 9 as information bar 605 (FIG. 6) and my account button 907 (FIG. 9), respectively, which were discussed in FIGS. 6 and 9, respectively.

Subscriptions title 1008 provides the title of the webpage. The webpage title 1008 in FIG. 10 is "Subscriptions" To indicate that subscriptions are listed in subscriptions page 1000. Page title 1008 may also include some information about the webpage in addition to the title. Page title 1008 may also include an icon to indicate the function of the webpage.

List of subscriptions 1010 (NTT Docomo), 1015 (Sing-Tel), 1020 (T mobile), and 1025 (AT&T) together provide a list of information, and of links, for each carrier to which the user has a subscription and the status of the subscription. The list of subscriptions may include plans that the user has purchased a plan with, current, and past. In an embodiment, each link has an indication as to whether the subscription has expired. In an embodiment, the list of subscriptions provides the name and/or icon of the carrier, with the country the carrier is active in. The list of subscription may also allow the user to navigate to a separate page for each separate carrier, providing more information about the plan(s) that are available. In the example in FIG. 10, all subscriptions other than AT&T have expired as indicated by the word "EXPIRED" next to the other carriers (e.g., NTT Docomo in Japan, SingTel in Singapore, and T-mobile in the USA).

Home link 1030, my account link 1040 and settings link 1050 are embodiments of home link 630, my account link 640 and settings link 650, which were discussed with reference to FIG. 6.

Figure 11:
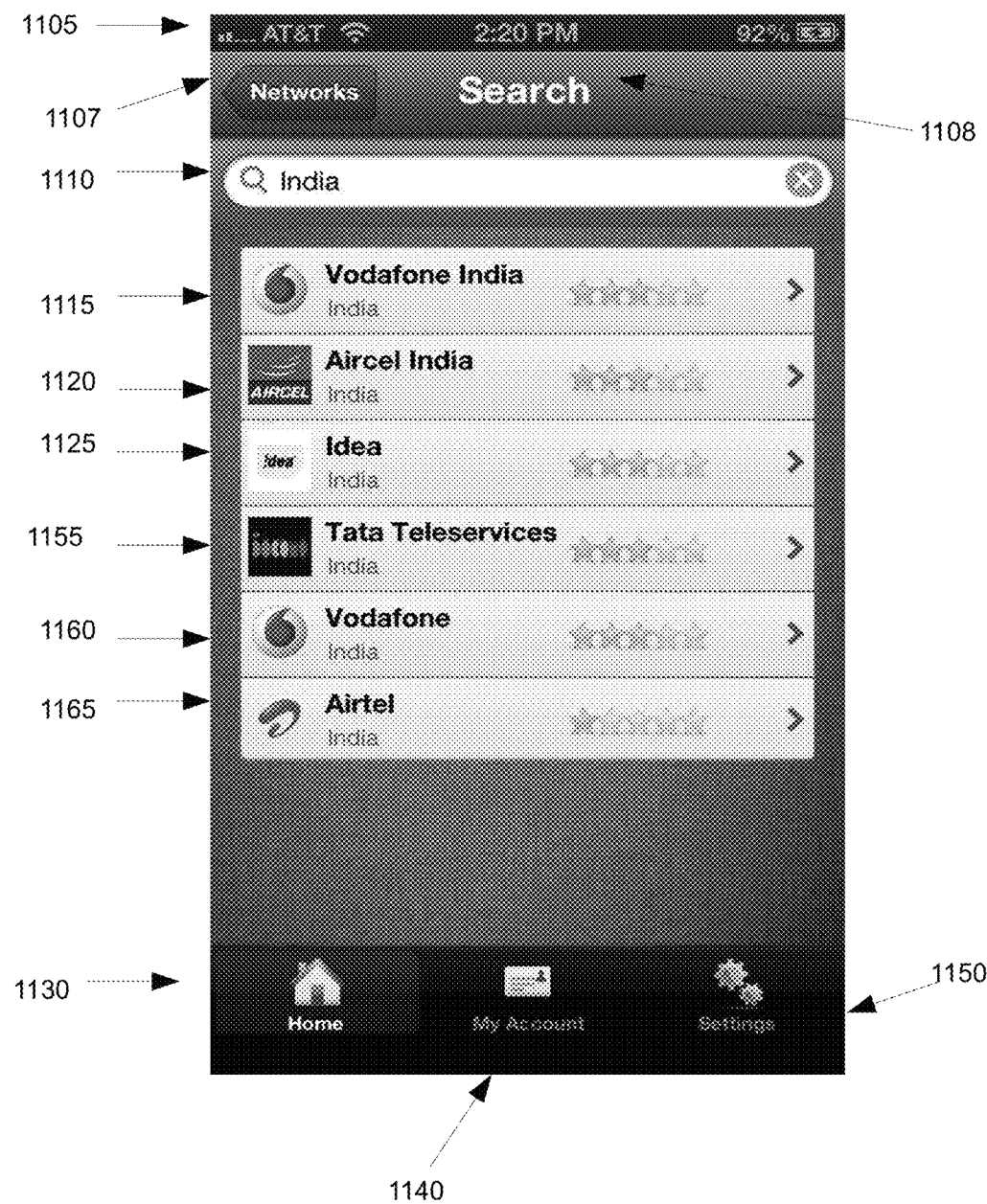
FIG. 11 is a screenshot of an example of a page for searching for and selecting a carrier from which to purchase local service, via from the primary global carrier.

FIG. 11 is a screenshot of an example of a search page 1100. The search page 1100 may include a information bar 1105, a networks button 1107, a search title 1108, a search window 1110, a list of carriers obtained from the search 1115, 1120, 1125, 1155, 1160 and 1165, a home link 1130, a my account link 1140 and a settings link 1150. In other embodiments, the search page 1100 may not have all of the elements listed and/or may have other elements in addition to or instead of those listed.

Search page 1100 may be used for searching for a carrier, from which local service may be purchased. Search page 1100 is an embodiment of search 468 (FIG. 4B). Information bar 1105 in an embodiment of information bar 605, which was discussed with reference to FIG. 6. Networks button 1107 is an embodiment of networks button 606, which was described with reference to FIG. 6.

Search title 1108 provides the title of the page. The webpage title 1108 in FIG. 11 is "Search," Indicating that the page may be used for searching. Page title 1108 may also include some information about the webpage in addition to the title. Page title 1108 may also include an icon to indicate the function of the page.

The search window 1110 functions to allow the user to search for carriers by a search string and/or any of a number criterion (e.g., name, company, etc.). In FIG. 11, the user searched the search string India, to find for carriers in that provide service in India. The user can perform a search and choose the carrier according to location and/or other criteria. In the example of FIG. 11 a list of carriers was obtained from the search for carriers in India.

The list of carriers obtained from the search include 1115 (Vodafone India), 1120 (Aircel India), 1125 (Idea), 1155 (Tata Teleservices), 1160 (Vodafone) and 1165 (Airtel) and together provide a list of activate-able links with information about the carriers obtained via the search. The information may include the name, icon, country, and/or a rating for each carrier. A link (e.g., designated by the arrowhead) may provide the user with a way to find out more information about the carrier, plans available for that carrier, and/or a way to purchase a plan. The link, when activated sends the user to a page specific to that carrier where the user can purchase a plan, find out more information about the carrier, and/or find out more information about plans available via that carrier.

Home link 1130, my account link 1140 and settings link 1150 have been discussed with reference to FIG. 6 as home link 630, my account link 640 and settings link 650.

Figure 12:
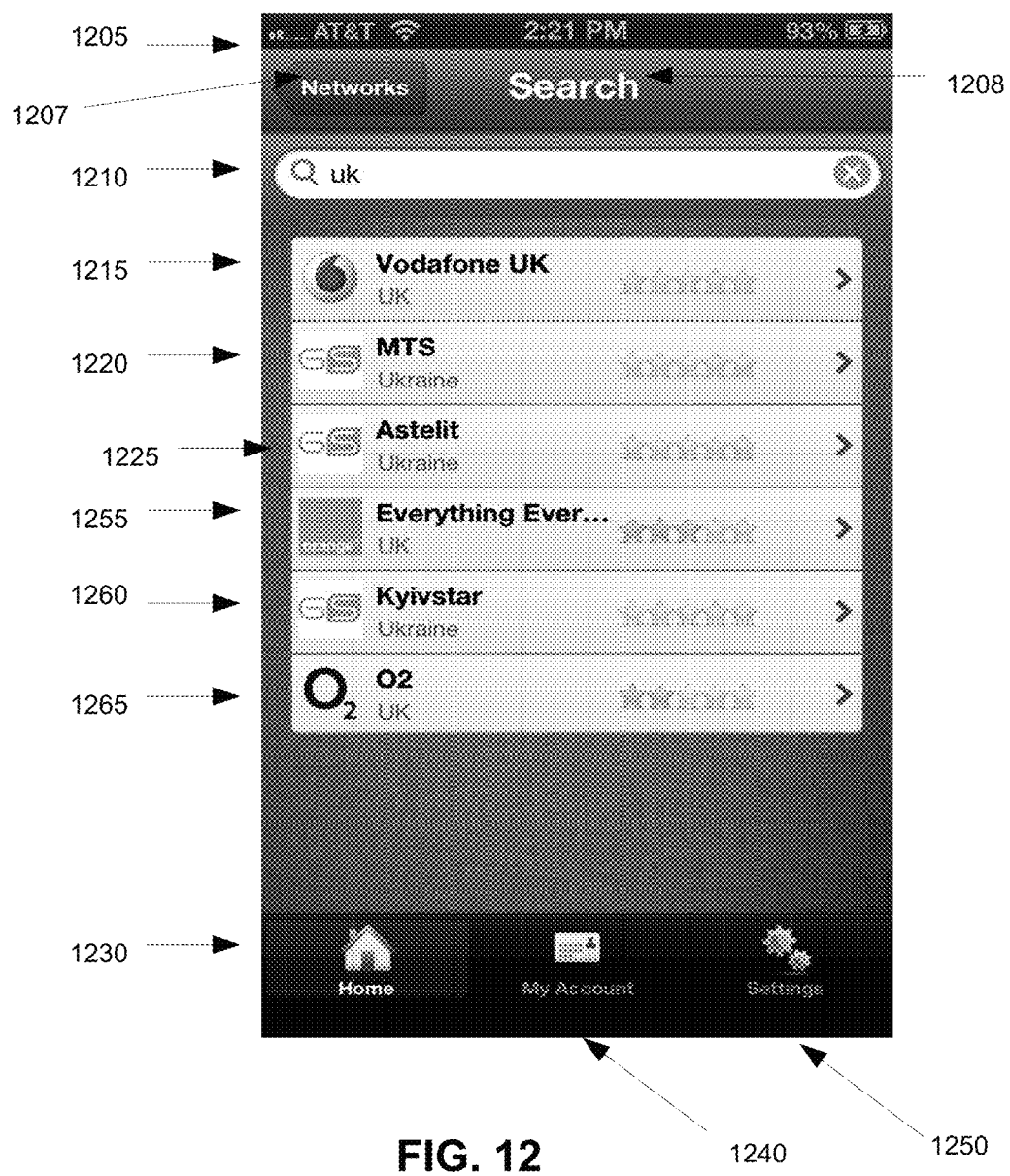
FIG. 12 is another screenshot of an example of a page for searching for and selecting a carrier from which to purchase local service, via the primary global carrier.

FIG. 12 is a screenshot of an example of a page for selecting a carrier from which to purchase service. The page 1200 may include a information bar 1205, a networks button 1207, a search title 1208, a search window 1210, a list of carriers obtained from the search 1215, 1220, 1225, 1255, 1260 and 1265, a home link 1230, a my account link 1240 and a settings link 1250. In other embodiment, the page 1200 may not have all of the elements listed and/or may have other elements in addition to or instead of those listed.

Information bar 1205 is an embodiment of information bar 605, which was discussed with reference to FIG. 6.

FIG. 12 is similar to FIG. 11, except that in FIG. 12 the search was for carriers in the UK (whereas in FIG. 11 the search was for carriers in India) and the list of carriers obtained from the search for UK was 1215 (Vodafone UK), 1220 (MTS), 1225 (Astelit), 1255 (Everything Ever . . . ), 1260 (Kyivster) and 1265 (O2). Networks button 1207, search title 1208, and search window 1210 have been discussed with reference to FIG. 11 as networks button 1107, search title 1108, and search window 1110. Home link 1230, my account link 1240 and settings link 1250 have been discussed with reference to FIG. 6 as home link 630, my account link 640 and settings link 650.

Figure 13:
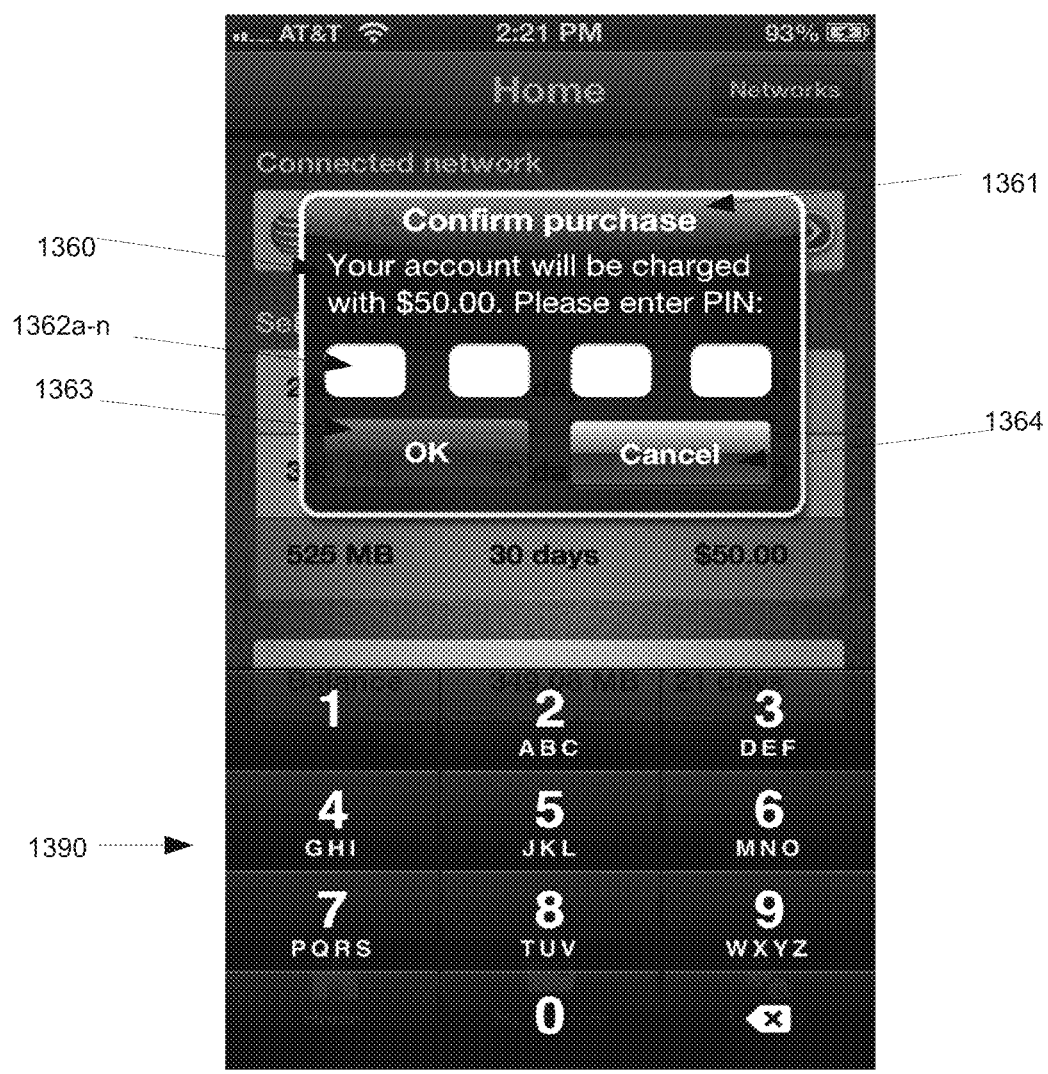
FIG. 13 shows a screenshot of an example of a box for paying for a purchase choice.

FIG. 13 shows a screenshot of an example of a purchase page 1300. The purchase page 1300 may include a confirm purchase window 1360, including a title with purchase information 1361, one or more windows to enter a PIN 1362*a-n*, an enter button 1363, a cancel button 1364, and a number pad 1390. In other embodiments, the page 1300 may not have all of the elements listed and/or may have other elements in addition to or instead of those listed.

On purchase page 1300, a box appears after the user makes a purchase choice. Purchase page 1300 is an embodiment of purchases 474 (FIG. 4B). The home page 600 of FIG. 6 is shown in the background. Confirm purchase window 1360 functions to allow the system to request the user to enter a PIN number and confirm the purchase by clicking on the OK button.

Confirm purchase window 1360 may have a title 1361. The title 1361 in the confirm purchase window 1360 in FIG. 13 is "Confirm purchase," Indicating that the user is being asked to confirm a purchase. The title 1361 may also include some information about the webpage in addition to the title and/or an icon to indicate the function of the webpage.

Confirm purchase window 1360 may have one or more fields to enter a PIN 1362*a-n*. The PIN can be from 4 to 20 spaces long (including numbers, letters, and/or symbols). The window may have information about what type of PIN is acceptable and/or safe.

Confirm purchase window 1360 may have an enter button 1363 that the user activates to confirm the purchase. The enter button may be indicated by an icon, a word (e.g., OK), or a phrase. The enter button may optionally take the user to a page allowing the user to review the purchase before confirming. In an embodiment, purchase page 1300 may be displayed as a result of selecting one of the top-up options on home page 600, purchasing or renewing a subscription, via subscription page 1000, purchasing a plan via search page 1200/1300 and/or when performing a purchase via another page.

Confirm purchase window 1360 may have a cancel button 1364 that allows the user to cancel the purchase. By activating the cancel button, the user may be sent back to the home page or that previous page that the user was viewing where the user can choose to exit the system completely, to choose a different plan, and/or navigate to another page.

Number pad 1390 provides numbers, letters and symbols for the user to enter a PIN into the confirm purchase window 1360.

Figure 14:
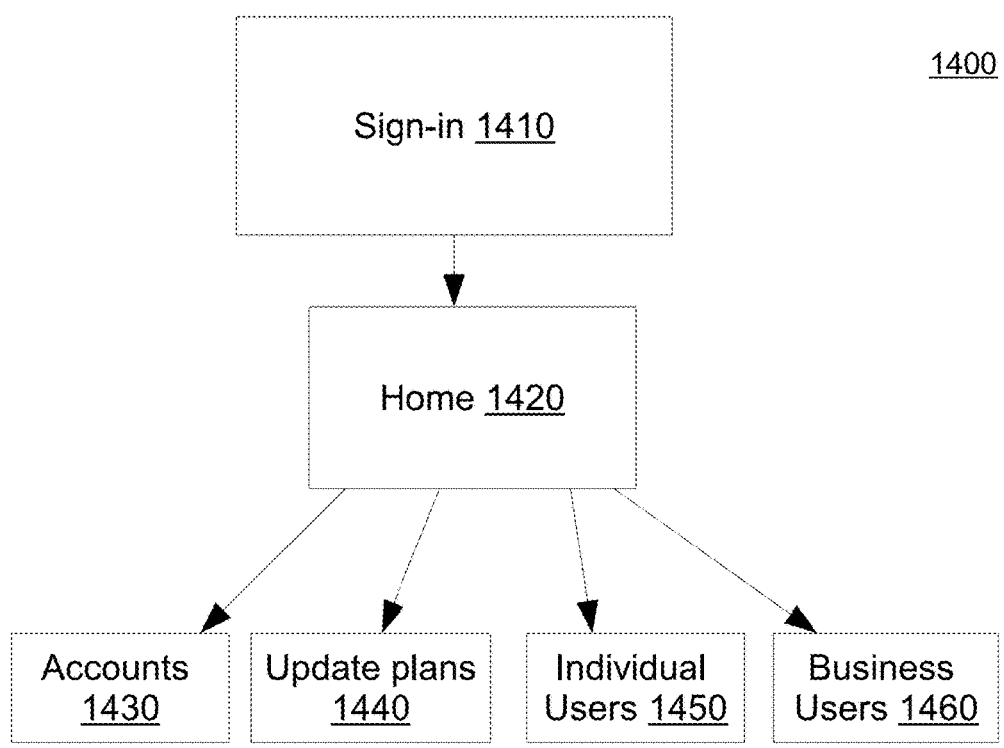
FIG. 14 shows a graph of an embodiment of pages of an application or GUI for a carrier.

FIG. 14 shows a graph 1400 of an embodiment of the pages of a carrier user interface (which may be a web based GUI or an application). The pages may include sign-in page 1410, home 1420, carrier account page 1430, update plans page 1440, individual pages 1450, and business pages 1460. In other embodiments, graph 1400 may include additional components and/or may not include all of the components listed above.

Sign-in page 1410 functions to allow the carrier to sign-in. Sign-in page 1410 allows the user to sign-in if the user has an account or to create an account if the user does not have an account. Sign-in page 1410 includes connections to a home page. Sign-in page 1410 may lead the user to the home page 1420. Links on the home page may be visible to the user prior to signing-in or creating an account, but may be nonfunctional until after the user signs in.

The home page 1420 can be accessed from the sign-in page 1410 or automatically presented to the user after the user signs-in. In an embodiment, home page 1420 and sign-in page 1410 may be the same or similar except sign-in page 1410 present a sign-in box to the user that disappears after successfully signing-in. The other links of the page may be inactive while the sign-in box is still present and may be active after successfully signing in and the sign-in box disappears. Home page 1420 may include connections to pages for individual consumers of services, for business consumers of services, for a carrier (e.g., where the carrier can update plans offered to consumers and where the carrier view the carrier's account with the marketplace provider), and for shopping online. In an embodiment, each page includes a connection to connections to pages for individual consumers of services, for business consumers of services, for a carrier and/or for shopping online Optionally, there may be further enrollment pages for a new carrier that does not currently offer plans on the marketplace server and/or one or more settings pages via which the carrier may enter and/or edit the carrier's settings, such as the user names and passwords of users authorized to access the carrier's pages.

The account page 1430, can be accessed from the home page 1420. Accounts page 1430 may provide the carrier with information about the carrier's account with the marketplace provider. Accounts page 1430 may show revenue of the carrier broken down according the plan offered and the month that the revenue was received. Accounts page 1430 may also include a link showing any payments or fees charged to the carrier, charged by the market place provider, and/or charged by the carrier to the market place provider and whether or not those fees have been paid. Accounts 1430 may also include connections to the home page, update plan, and settings. In an embodiment, the settings may be initially entered as part of creating an account and/or enrolling in a program, and then later edited, via a settings page. Accounts page 1430 can contain information and links to accounts for all services the carrier may be enrolled in, including long distance, advertisements, etc.

Update plans page 1440 functions to allow the carrier to update plans associated with the one or more services. For example, update plans page 1440 may allow the carrier to change the prices for various plans (the update plans page will be discussed further in conjunction with FIGS. 17 and 18).

Individual pages 1450 are a group of pages for individual consumers of plans, via which individual consumers may purchase plans, via server 180, on any of carriers 110a-n. Home page 1420 includes a link to individual pages 1450. Business pages 1460 are a group of pages for business consumers of plans, via which businesses may purchase plans, via server 180, on any of carriers 110a-n. Home page 1420 includes a link to business pages 1460.

FIGS. 15-20 are screenshots of pages of a graphical user interface or application that allows carriers to access the system for all of the services it provides and selecting between a variety of phone services in various locations.

Figure 15:
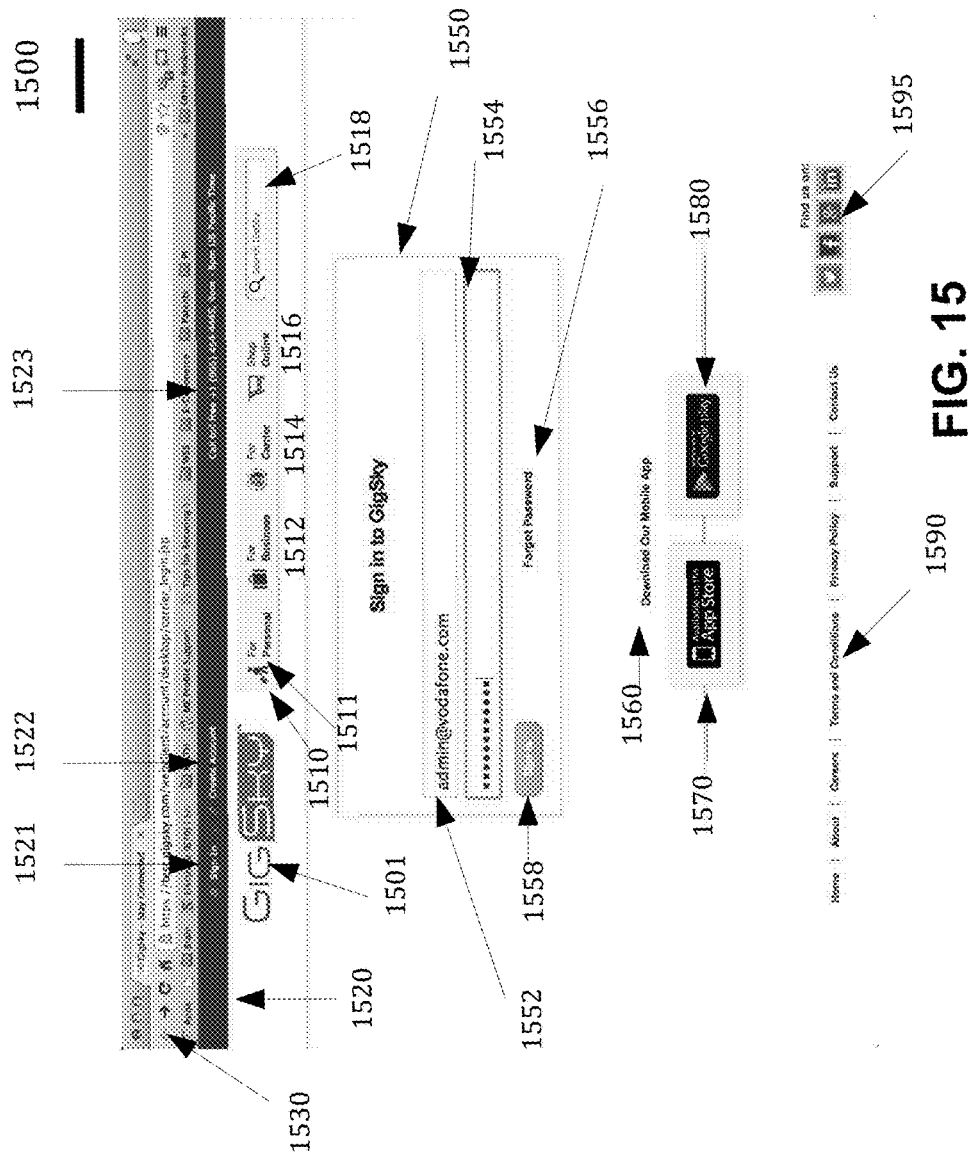
FIG. 15 shows an example of a sign-in/sign-up page for a marketplace service that provides mobile phone service.

FIG. 15 shows an example of a sign-in/sign-up page 1500 for a service that provides mobile phone service. The sign-in/sign-up page 1500 may include a company title area 1501, a store bar 1510 with a personal button 1511, a business button 1512, a carrier button 1514, a shop online button 1516, and a search window 1518. The sign-in/sign-up page 1500 may include a pre-sign-in navigation bar 1520, with a sign-in button 1521, a create account button 1522, and contact information button 1523. The sign-in/sign-up page 1500 may also include a webpage bar 1530, a sign-in window 1550 having an field 1552 user identifier field 1552, a password field 1554, a sign in enter button 1558, and a forgot password link 1556. The sign-in/sign-up page 1500 may also include a download link 1560, an app store link 1570, a play link 1580, a company information bar 1590, and a social network link 1595. In other embodiments, the page 1500 may not have all of the elements listed and/or may have other elements in addition to or instead of those listed.

The company title area 1501 provides the title of the company sponsoring the page, the market place provider, which is the provider of the marketplace mobile phone service. The company title 1501 in the example of FIG. 15 is "GIGSKY." The company title 1501 may also include some information about the company and/or webpage in addition to the title. Company title 1501 may also include a company icon and/or logo.

The store bar 1510 (which may includes a personal button, a business button, a carrier button, a shop online button, and a search window) functions to allow a user of the system to find other parts of the user interface where the user may want to purchase products from the marketplace provide, via server 180. A user of the system may be a carrier or a consumer of wireless services.

Personal button 1511, when selected may bring the user to a portion of the interface in which the user can manage a personal phone service account. For example, the user may use the pages related to personal button 1511 to view accounts for personal wireless service with different carriers, purchase service for a personal phone from one or more of carriers 110a-n, top-up personal accounts that have low balances on the personal accounts with carriers 110a-n.

Business button 1512, when selected, may bring the user to a portion of the interface in which the user can manage a business wireless service account. For example, the user may use the pages related to business button 1511 to view accounts for business wireless service with different carriers, purchase service for a business phone from one or more of carriers 110a-n, top-up business accounts that have low balances on the business accounts with carriers 110a-n. Business accounts may have different levels of access for different users. A user in the roll of an administrator may have authorization to purchase new services or top-up services for any user account associated with the business. The administrator may have authorization to transfer service between two users of the business that the administrator is associated with. Another user having a lower level of access may only be able to purchase services for the user's own account that is associated with the business and may or may not have the authorization to transfer unused services to another user account of the same business. Another user having yet a lower level of access may only be able to view account balances for the account that that user uses, but not have any authorization for purchasing services.

Carrier button 1514, when activated may bring the user to a set of interface pages that allow the user to change the plans offered by that user and view the carrier's revenues, fees paid or owed by the carrier to the market place provider and/or fees paid or owed by the market place provider to the carrier.

Shop online button 1516, when activated, may bring the user to a page for purchasing desired products and/or services. Search window 1518 may allow the user to enter a string to find different features of the site. If the user is a consumer of services provided by the carriers 110a-n, server 180 of the marketplace provider, search window 1518 may be used for searching for different plans by different carriers available in different locations.

The pre-sign-in bar 1520 is a bar that may be used for signing-in and/or creating an account. Sign-in button 1521 may be used by a user already having an account to sign-in. Activating sign-in button 1521 may cause assign-in dialog box to be displayed.

Create account button 1522, when activated, may cause the user to be brought to a part of the user interface for creating an account and entering initial values for various settings.

Contact information button 1523, when activated, may cause a page to be displayed having contact information for the marketplace provider, such as one or more physical addresses, e-mail addresses, social media addresses, instant message addresses and/or phone numbers. Contact information button 1523 may also provide information about the "store hours" or the time that the user can telephone and speak to a representative of the marketplace provider (such as "9 am-5 pm US Pacific Time").

The webpage bar 1530 is an example of a browser menu or toolbar, which may provide to access the system GUI. Alternatively, a user can download an app and interact with server 180, via the app.

Sign-in window 1550 may include one or more fields for entering user information that may be used for authenticating the user.

User identifier field 1552 may include a field for entering a user identifier. In the example of FIG. 15, the user's e-mail address is used as the user identifier. In other embodiments, the user identifier may include other combinations of symbols and characters.

Password field 1554 may include a field for entering a password. The password may be necessary to ensure that the user is authorized to user the account having the user identifier entered into user identifier field 1552.

Sign-in button 1558, when activated, may initiate an authentication process in which server 180 authenticates the user to determine whether or not to grant access. Sign-in button 1558, when activated, may cause the user identifier and password entered into user identifier field 1552 and password field 1554, respectively, to be sent to server 180 for authentication.

Forgot password link 1556, when activated, may bring the user to a page for entering other credentials that may be used to authenticate the user.

The download link 1560, when activated may cause an application for interfacing with server 180 to be downloaded. The application may have similar pages as are available, via GUI 193 (which may include the webpages of FIGS. 16-20).

The app store link 1570 when activated (e.g., by clicking) sends the user to a page where the user can purchase apps, which may include application 191. For example, clicking on app store link 1570 may bring the user to the Apple app store, another app store, or a menu of different app stores to choose from.

The play link 1580 functions to provide a link to another site that allows users to download mobile apps. In the example of FIG. 15, play link 1580 is a Google play link. In other embodiments another play link may be provided, or the play link may bring the user to a menu of play links by different providers to choose form.

The company information bar 1590 includes a number of links that are specific to the company or network. The company information bar in FIG. 15 provides the user with links to the company's home page (home), a page giving more information about the company (about), a career page (career), a terms and conditions page, a privacy policy page, a support page where the user can get help via telephone or email, and a contact us page that provides the user with contact information for the company. The company information bar 1590 also includes a button (about) for viewing more information about the site and the service provided.

The social network link 1595 provides one or more links to social networks (e.g., Twitter®, Facebook®, Google®, and LinedIn®). The social network link 1595 gives the user the option of signing in via a social network. When activated, the social network link 1595 sends the user to a page where the user can sign in or sign up for the social network. FIG. 15 may also include a button for signing up to the website and the service provided by the website for the first time (a sign-up button).

Figure 16:
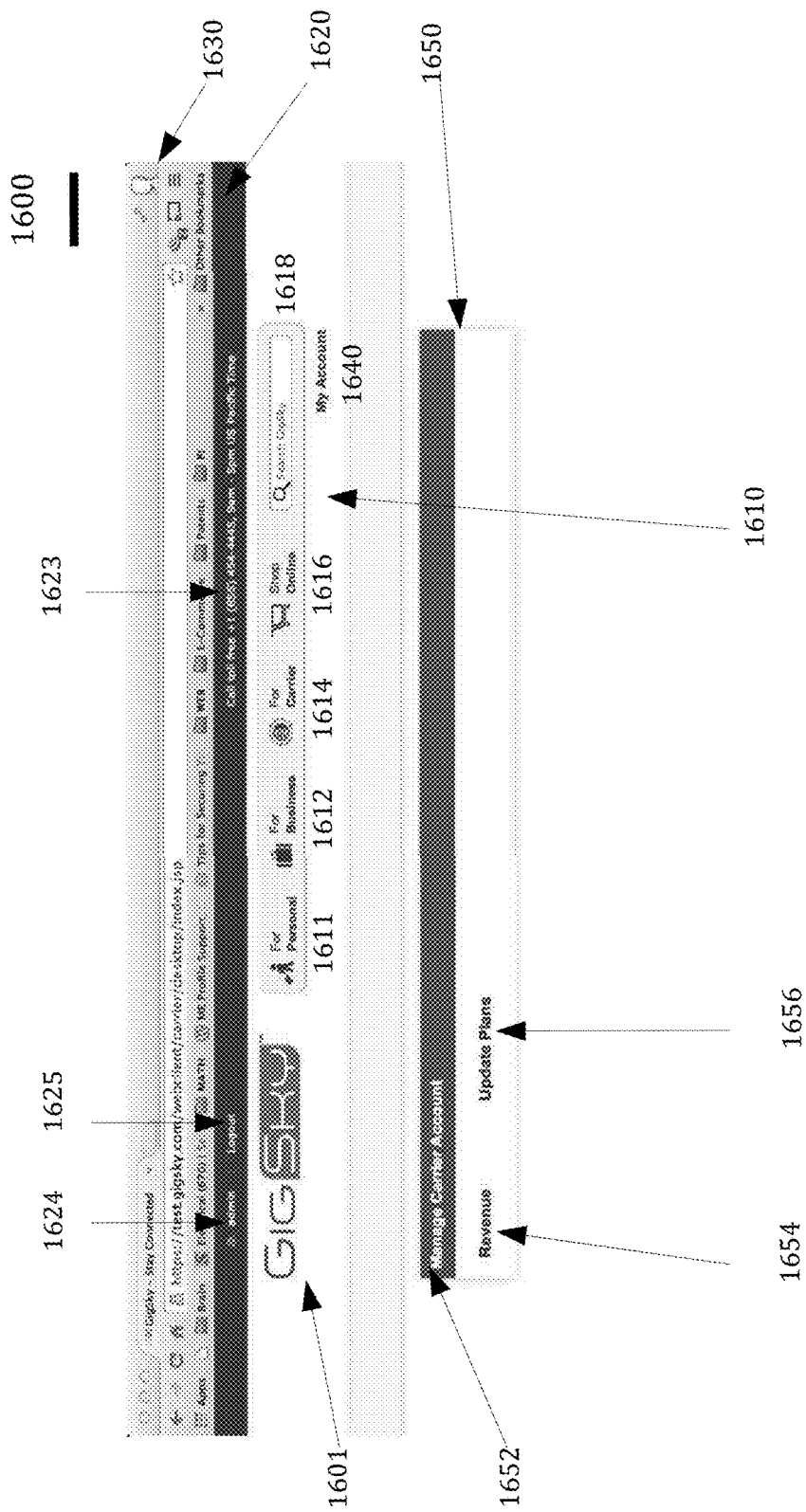
FIG. 16 shows a screenshot of an example of a page for a carrier to manage carrier accounts.

FIG. 16 shows a screenshot of an example of a page 1600 for adding time and/or data by a carrier using the system 100. The page for adding time and/or data may include a company title area 1601, a store bar 1610 with a personal button 1611, a business button 1612, a carrier button 1614, a shop online button 1616, and a search window 1618, a sign-in bar 1620, with a sign-in button 1621, a create account button 1622, and contact information button 1623, a webpage bar 1630, an account window 1650, having a window title 1652, a revenue link 1654, and an update plans link 1656. In other embodiments 1600 may not have all of the elements or features listed and/or may have other elements or features instead of or in addition to those listed.

The company title area 1601, a store bar 1610, personal button 1611, business button 1612, carrier button 1614, shop online button 1616, search window 1618, sign-in bar 1620, sign-in button 1621, create account button 1622, contact information button 1623, and webpage bar 1630 are embodiments of title area 1501, store bar 1510, personal button 1511, business button 1512, carrier button 1514, shop online button 1516, search window 1518, pre-sign-in bar 1520, sign-in button 1521, create account button 1522, contact information button 1523, and webpage bar 1530, respectively, which have all been discussed with reference to FIG. 15 as company.

Account window 1650, provides links for accessing information about the carrier's account and different pages of to the carrier's account. For example a specific carrier (e.g., Vodafone India) may use pages linked to account window 1650 to access pages for looking up how many people signed up for services provided by Vodafone India, how much the carrier and/or the marketplace provider paid to one another, how much the carrier paid for ads or placement in the system. Account window 1650 may link to pages where the carrier can make changes to plans offered to consumers and view revenues resulting from those plans.

Window title 1652 provides is a title for the window of account window 1650, which briefly describes the purpose of account window 1650. In the example of FIG. 16, the window title of account window 1650 is "Manage Carrier Accounts."

Revenue link 1654, when activated brings the user to one or more pages where the user may view revenue resulting from the different plans that the carrier offers to consumers of wireless services (an example of a revenue page will be discussed in conjunction with FIG. 20, below).

Update plans link 1656 can be activated to allow the carrier to update plans (an example of a page for updating plans will be discussed further in conjunction with FIGS. 17 and 18, below).

Figure 17:
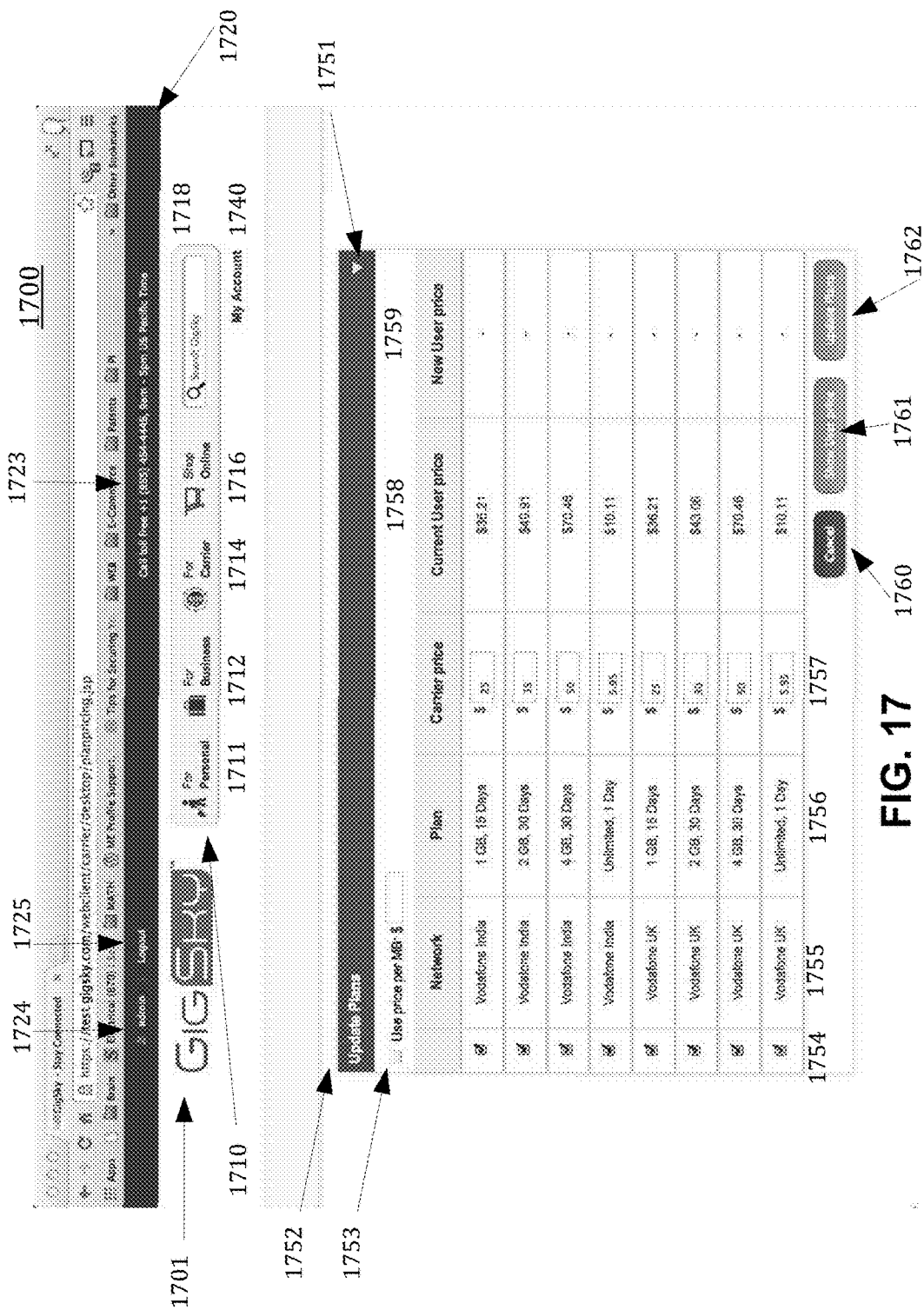
FIG. 17 shows a screenshot of an example of a page for a carrier to choose plans and prices for wireless services that are offered to consumers, prior to updating the prices and plans.

FIG. 17 shows a screenshot of an example of a carrier plans page 1700 listing plans offered by a carrier. The carrier plans page 1700 may include a company title area 1701, and a store bar 1710 having a personal button 1711, a business button 1712, a carrier button 1714, a shop online button 1716, and a search window 1718. The carrier plans page 1700 may include a sign-in bar 1720, with a sign-in button 1721, a create account button 1722, and contact information button 1723. The carrier plans page 1700 may include a webpage bar 1730. The carrier plans page 1700 may include a plans window 1750, having a title 1752, an arrow 1751, a price basis 1753, a plan indication column 1754, a network column 1755, a plan column 1756, a carrier price column 1757, a current user price column 1758, a new user price column 1759, a cancel button 1760, a show user price button 1761, and an update plans button 1762. In other embodiments 1700 may not have all of the elements or features listed and/or may have other elements or features instead of or in addition to those listed.

The company title area 1701, store bar 1710, personal button 1711, business button 1712, carrier button 1714, shop online button 1716, search window 1718, sign-in bar 1720, sign-in button 1721, create account button 1722, and contact information button 1723, a webpage bar 1730 are embodiments of title area 1501, store bar 1510, personal button 1511, business button 1512, carrier button 1514, shop online button 1516, search window 1518, pre-sign-in bar 1520, sign-in button 1521, create account button 1522, contact information button 1523, and webpage bar 1530, respectively, which have all been discussed with reference to FIG. 15.

Plans window 1750 provides a listing of all of the plans offered by the current carrier, which may include information about the manner in which the carrier and plan are listed in marketplace the price charged by the carrier price, current price charged to the user, and new price charged to the user price. New user price column only changes if the carrier makes a change to a plan, more specifically a change to the carrier price. For example, in FIG. 18, the carrier made a change to the carrier price for each of the plans and the new user price is indicated.

Title 1752 gives a title for the main window on the page of FIG. 17, which briefly describes the purpose of the window. In the example of FIG. 17, the title is "Update Plans" indication that the carrier may update the services offered to the user via plans window 1750. Arrow 1751 is a link that allows the user to switch to another page. For example, selecting arrow 1751, may allow the user to view other account information that is of interest to the carrier or to see the next page of plans offered to consumers.

Price basis 1753 is a combination of fields that allows the user to select a basis for determining prices. In the example of FIG. 17, price basis 1753 includes a check box, which if checked causes the basis of pricing of price 1753 to be applied to all plans. In the example of FIG. 17, when the check box is checked, the basis of the pricing is the units of data that the user may consume. In the example of FIG. 17, a field is provided for entering the price per unit of data that the user purchases. If the user purchases 1 MB of data, after the user has transferred 1 MB of data, the account is depleted unless replenished by the user.

Plan participation column 1754 is a column of fields in which the carrier may enter whether the carrier want to offer a plan of the nature described in the rest of the row. In the example of FIG. 17 a check box is used to indicate whether the carrier desires to offer the corresponding plan, but in other embodiments, an x, a true/false indicator or yes/no or another type of field may be used instead. Marketplace provider may have a set of preconfigured plans in which the data available for the user and the duration of the plan is already specified. The Carrier just needs to determine whether the carrier wants to offer such a plan (e.g., by checking the check box of the plan participation field) and, if the carrier decides to participate in that plan, the price at which the carrier will be compensated for that plan.

Network column 1755 indicates the network associated with the plan being offered. For example, the same carrier may own different networks in different locations, and each may offer different prices and units of service that may be purchased. In the example of FIG. 17, Vodafone has one network, Vodafone India, which offers service in India, and another network, Vodafone UK, which offers service in the UK.

Plan column 1756 lists details the plans. In the example of FIG. 17, each plan lists the amount of data that the user is entitled to transfer and the amount of time that the plan lasts. In an embodiment, if the amount of time expires or the amount of data is consumed (whichever occurs first), the account expires.

Carrier price column 1757 includes price at which the carrier offers the plan. In an embodiment, carrier price column 1757 may include one field for each plan. The user may individually enter a price for each of the plans offered by the carrier in the fields of carrier price column 1757.

Current user price column 1758 may list the price that is currently offered to the consumer of the wireless service. The current user price may be different than the current price of the carrier in carrier price column 1757. For example, the marketplace provider may offer the plan at a higher price than the carrier asks for, and the difference in price may be used to cover expenses of the marketplace provider and/or may cover a profit that the market place provider collects. Alternatively, at times the marketplace provider may offer a plan of a carrier at a lower rate than the carrier is being paid (thereby potentially incurring a loss in revenue whenever a user purchases the plan) as a promotional offer.

New user price column 1759 indicates what the user price will be charged to as a result of the carrier changing the carrier price listed in carrier price column 1757.

Cancel button 1760, when activated, causes the changes made to the plans offered, via update plan 1752, to be cancelled, which thereby allows the carrier to cancel the change if the carrier decides not to update the plans. Once activated, the carrier may be returned to the home page, or to the carrier's account page.

The show user price button 1761, when activated, causes the user price to be calculated based on the carrier price entered into carrier price column 1757, and causes the user price calculated to be displayed in new user price column 1859.

Update plans button 1762, when activated, accepts the carrier's change(s) to the plan or plans. In an embodiment, the current user price is not updated until after the change is reviewed and approved by a representative or employee of the marketplace provider, which may require a human to review the proposed carrier prices entered by the carrier. Alternatively, server 180 may automatically approve or reject the carrier plan prices entered by the carrier. In an embodiment, after activating the update plans button 1762 and after the marketplace provider approves, new user price becomes the current user price. For example, in an embodiment, if the user already activated the show user price button 1761 (and consequently, the new user price column is current), then the new user price column 1759 becomes the current price in current user price column 1758. However, if update plans button 1762 is activated without updating new user plan price 1759, then the current user price updated to the appropriate value regardless of the value in current user price 1758.

Figure 18:
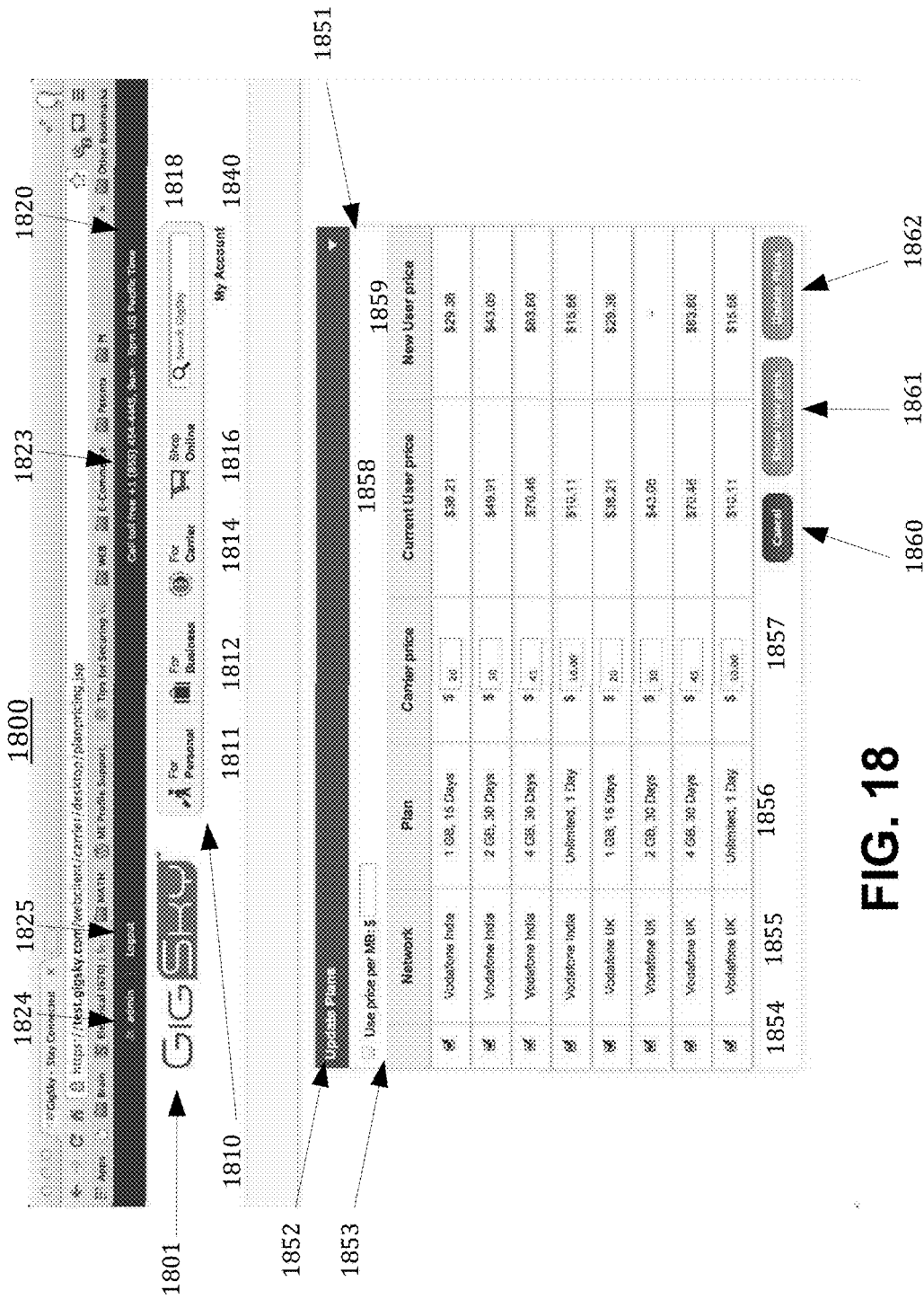
FIG. 18 shows a screenshot of an example of a page for a carrier to choose plans and prices for wireless services that are offered to consumers, after updating the prices and plans.

FIG. 18 shows another screenshot of an example of a page 1800 listing plans for a carrier subscribed to system 100. The page 1800 is identical to FIG. 17 except that the carrier prices and/or plans have been changed by the carrier. In other words, the carrier plans page 1800, company title area 1801, store bar 1810, personal button 1811, business button 1812, carrier button 1814, shop online button 1816, search window 1818, sign-in bar 1820, sign-in button 1821, create account button 1822, contact information button 1823, webpage bar 1830, plans window 1850, title 1852, arrow 1851, price basis 1853, plan indication column 1854, network column 1855, plan column 1856, carrier price column 1857, current user price column 1858, new user price column 1859, a cancel button 1860, show user price button 1861, and update plans button 1862 are embodiments of carrier plans page 1700, company title area 1701, store bar 1710, personal button 1711, business button 1712, carrier button 1714, shop online button 1716, search window 1718, sign-in bar 1720, sign-in button 1721, create account button 1722, contact information button 1723, webpage bar 1730, plans window 1750, title 1752, arrow 1751, price basis 1753, plan indication column 1754, network column 1755, plan column 1756, carrier price column 1757, current user price column 1758, new user price column 1759, cancel button 1760, show user price button 1761, and an update plans button 1762, respectively, which were discussed in conjunction with FIG. 17.

See, for example, Vodafone India plan with 1 GB, 15 days has been changed from a carrier price of $25 (in FIG. 10) to a carrier price of $20 in FIG. 18. New user price column only changes if the carrier makes a change to a plan, more specifically a change to the carrier price. For example, in FIG. 18, the carrier made a change to the carrier price for each of the plans and the new user price is indicated for each of the plans. Thus, FIG. 18 is an example of what happen if the carrier activated the show user price button 1161.

Figure 19:
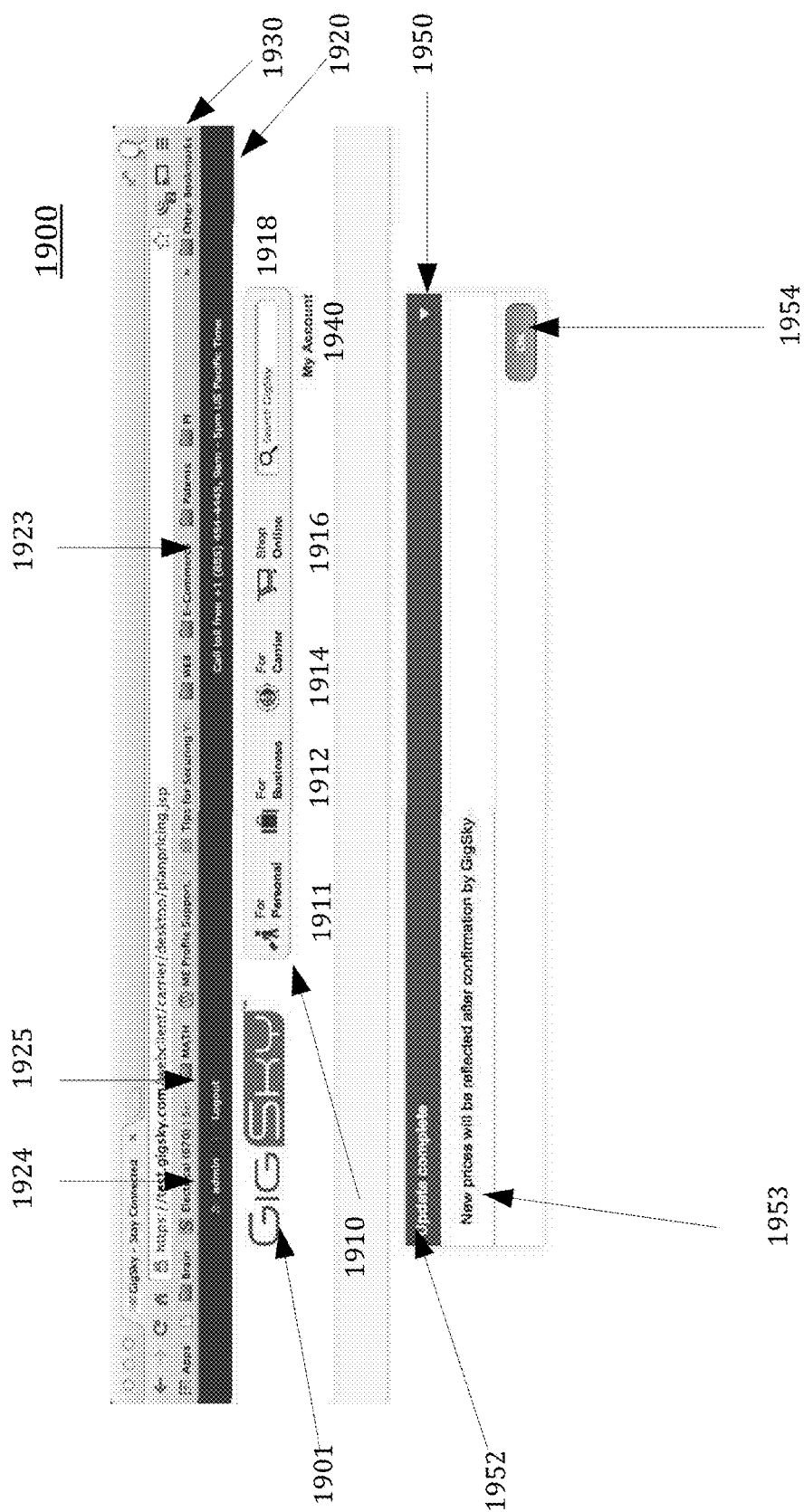
FIG. 19 shows a screenshot of an example of a page shown to the carrier after the carrier has submitted the update to prices and plans.

FIG. 19 shows a screenshot of an example of a page 1900 shown to the carrier after the carrier has changed the prices and/or plans in FIGS. 17 and 18 used in system 100. The page 1900 may include a company title area 1901, a store bar 1910 with a personal button 1911, a business button 1912, a carrier button 1914, a shop online button 1916, and a search window 1918, a sign-in bar 1920, with a sign-in button 1921, a create account button 1922, and contact information button 1923, a webpage bar 1930, an update window 1950, having an arrow 1951, a window title 1952, an information section 1953, and an acknowledgement button 1954. In other embodiments 1900 may not have all of the elements or features listed and/or may have other elements or features instead of or in addition to those listed.

The company title area 1901, store bar 1910, personal button 1911, business button 1912, carrier button 1914, shop online button 1916, search window 1918, sign-in bar 1920, sign-in button 1921, create account button 1922, contact information button 1923, webpage bar 1930 are embodiments of title area 1501, store bar 1510, personal button 1511, business button 1512, carrier button 1514, shop online button 1516, search window 1518, pre-sign-in bar 1520, sign-in button 1521, create account button 1522, contact information button 1523, and webpage bar 1530, respectively, which have all been discussed with reference to FIG. 15.

An update window 1950 is a box that appears after the user has activated the update plans button (1762 or 1862) in FIG. 17 or 18. In an embodiment, update window 1950 confirms that server 180 received the proposed update to the plans of the carrier that are offered to consumers, and informs the carrier that the updates will not be visible until the proposed updates are confirmed (e.g., approved) by the marketplace provider.

The arrow 1951, when activated provides a menu of other carrier pages and/or other pages of the interface that the user may want to view.

Window title 1952 is "update complete" and provides information about what the window that appears is providing. In this case information about the update.

Information section 1953 provides more information about the update, such as when the update will be reflected in the carrier plan page. For example, the embodiment of FIG. 19, information section 1953 includes the caption, "new prices will be reflected after confirmation by GigSky."

Acknowledgement button 1954, when indicated, provides a confirmation that the carrier accepts the update and that the carrier received an update message. Acknowledgement button 1954, when activated, indicates that the carrier has read the content of update window 1950. Also, in an embodiment, after activating acknowledgement button 1954, the user is returned carrier plan page 1700.

Figure 20:
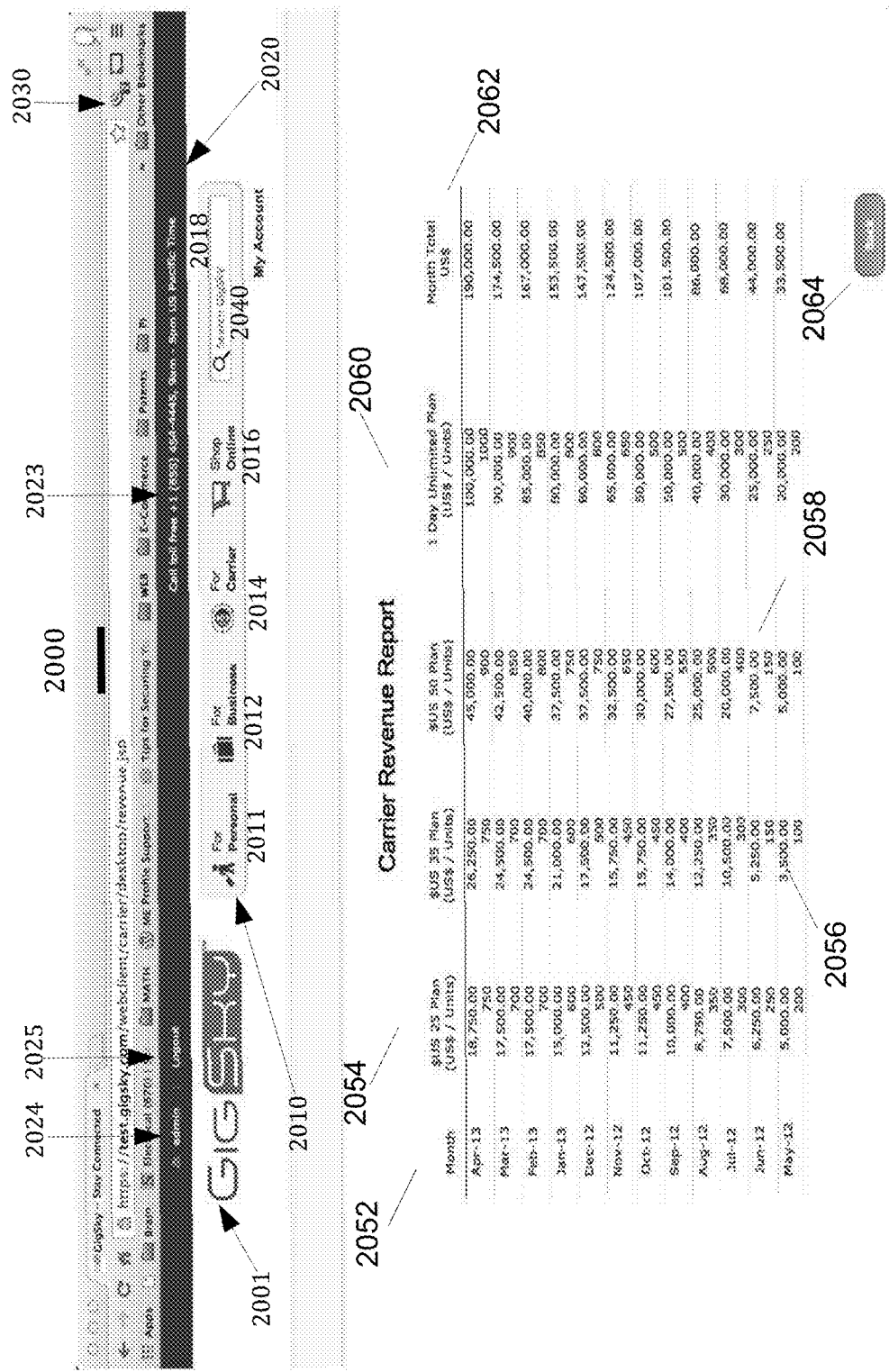
FIG. 20 shows a screenshot of an example of page showing account information.

FIG. 20 shows a screenshot of an example of a revenue page 2000 listing plans offered by a carrier. The carrier plans page 2000 may include a company title area 2001, and a store bar 2010 having a personal button 2011, a business button 2012, a carrier button 2014, a shop online button 2016, and a search window 2018. The carrier plans page 2000 may include a sign-in bar 2020, with a sign-in button 2021, a create account button 2022, and contact information button 2023. The carrier plans page 2000 may include a webpage bar 2030, date column 2052, first plan column 2054, second plan column 2056, third plan column 2058, fourth plan column 2060, and total column 2062. In other embodiments 2000 may not have all of the elements or features listed and/or may have other elements or features instead of or in addition to those listed.

The company title area 2001, store bar 2010, personal button 2011, business button 2012, carrier button 2014, shop online button 2016, search window 2018, sign-in bar 2020, sign-in button 2021, create account button 2022, and contact information button 2023, a webpage bar 2030 are embodiments of title area 1501, store bar 1510, personal button 1511, business button 1512, carrier button 1514, shop online button 1516, search window 1518, pre-sign-in bar 1520, sign-in button 1521, create account button 1522, contact information button 1523, and webpage bar 1530, respectively, which have all been discussed with reference to FIG. 15.

Page 2000 shows a month-by-month, plan-by-plan breakdown of revenues. Date column 2052 shows the period to time during which the revenue of the same row was collected. In the example of FIG. 20, the time period is one month, and the date listed is the month and year of the time period listed in the same row. Each of the columns first plan column 2054, second plan column 2056, third plan column 2058, and fourth plan column 2060 correspond to a different plan offered by the carrier. In each field of each column is revenue for the month and plan associated with the field. In the example of FIG. 20, corresponding to each month and plan, a value representing the amount of cash gained is displayed as well as an indication of the number of units purchased.

Totals column 2062 shows the total revenue for each month for all of the plans combined and the total number of units of data combined from each plan for that month that was purchased by users.

Back button 2064, when activate brings the user back to the prior page that the user was viewing.

ALTERNATIVES AND EXTENSIONS

In an embodiment, a method for providing wireless service to a user outside of the user's service area is provided. A collection of IMSIs and Kis from a variety of locations on a server are stored. A request for a local service is received, where the local service is provided based on a SIM having an IMSI and Ki of the server storing the collection of IMSIs and Kis. An IMSI and a Ki of the carrier are encrypted with a Ki of the server and sent to the user. In other words, in an embodiment, the method may include storing a collection of IMSIs and Kis for a variety of different carriers and a record of pre-purchased service on the carriers. A selection of a carrier may be received. Optionally, an IMSI and Ki of the user making the selection may be received to verify the identity of the requestor. The IMSI and Ki of the carrier selected by the user may be encrypted with the Ki of the server. The encrypted IMSI and Ki (encrypted with the Ki of the server) are sent to the user.

The method may further include in response to receiving a request for service, a location of the requestor may be determined. A list of carriers for that location may be retrieved, and the list may then be sent to the user device.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method comprising:
sending, from a server, to a mobile device information which when consumed by the mobile device causes the mobile device to display a list of carriers that are active in a location for the user to select, the server including a processor system having one or more processor and a memory system;
receiving, at the server from the mobile device, a selection of a carrier;
sending from the server an encrypted IMSI and an encrypted Ki of the carrier to the mobile device, the IMSI and the Ki of the carrier being encrypted with a Ki of the server, the Ki of the server being different from the encrypted Ki of the carrier; and
establishing by the server, local wireless service, via the carrier, for the mobile device.

2. The method of claim 1, further comprising:
displaying a list of virtual SIMs on the mobile device.

3. The method of claim 1, further comprising displaying an indication of locations where the local wireless service is available, wherein the local wireless service includes prepaid data plans of mobile phone services.

4. The method of claim 1, further comprising sending from the server to the user's mobile device, information which when consumed by the user's mobile device cause a list of service plans for the carrier to be displayed.

5. The method of claim 1, further comprising receiving at the server, a request to perform a search for at least one wireless carrier meeting a selected search criterion, and in response searching for the at least one wireless carrier meeting the search criterion; sending from the server information, which when consumed by the mobile device causes the mobile device to display results of the searching.

6. The method of claim 5, wherein the selection of the carrier is a selection of a carrier found by the searching.

7. The method of claim 5, further comprising sending from the server to the mobile device, information which when consumed by the mobile device causes a list of plans for one or more carriers identified in the results to be displayed on a display of the mobile device.

8. The method of claim 1, wherein the mobile device is a cell phone.

9. The method of claim 1, further comprising sending from the server to the mobile device, information which when consumed by the mobile device causes a list of carriers that the user has had plans with to be displayed on the user device.

10. The method of claim 9, further comprising sending from the server to the mobile device, information which when consumed by the mobile device causes the mobile device to display an indication of locations where the carriers provide prepaid data plans of mobile phone service.

11. The method of claim 1, further comprising sending a list of subscriptions that the user has had and the subscriptions the user now has and indicating whether the subscriptions are active.

12. The method of claim 1, further comprising sending from the server to the mobile device, information which when consumed by the mobile device causes a page that allows the user to purchase a plan to be displayed on the mobile device.

13. The method of claim 1, further comprising sending from the server to the mobile device, information which when consumed by the mobile device causes a sign-in page to be displayed on the mobile device.

14. The method of claim 13, wherein the user is required to sign in via the sign-in page on the mobile device to purchase a plan.

15. The method of claim 1, wherein the Ki of the server is a Ki of a carrier that the user has had at least a service plan with.

16. The method of claim 1, further comprising
decrypting, by the mobile device, the encrypted IMSI and the encrypted Ki of the carrier using the Ki of the server.

17. The method of claim 1, wherein the mobile device has service with multiple mobile networks simultaneously.

18. The method of claim 1, further comprising: sending from the server to the mobile device information that causes information about at least topup options to be displayed on the mobile device.

19. A system comprising:
a server including a processor system having one or more processors and
a memory system storing on at least one non-transitory computer readable media one or more machine instructions, which when implemented causes the server to implement a method including at least
sending, from a server, to a mobile device information which when consumed by the mobile device causes the mobile device to display a list of carriers that are active in a location for the user to select;
receiving, at the server from the mobile device, a selection of a carrier;
sending, from the server, an encrypted IMSI and an encrypted Ki of the carrier to the mobile device, the IMSI and the Ki of the carrier being encrypted with a Ki of the server, the Ki of the server being different from the Ki of the carrier; and
establishing by the server, local wireless service, via the carrier, for the mobile device.

20. A method comprising:
receiving, from a server, at a mobile device, user information, which when consumed by the mobile device causes the mobile device to display a list of carriers that are active in a location for the user to select and a list of subscriptions that the user has had and the subscriptions the user now has, the mobile device including a processor system having one or more processors and a memory system;
sending, to the server from the mobile device, a selection of a carrier and a selection of a prepaid data plan;
receiving from the server an encrypted IMSI and an encrypted Ki of the carrier to the mobile device, the IMSI and the Ki of the carrier being encrypted with a Ki of the server, the Ki of the server being different from the encrypted Ki of the carrier;
decrypting, by the mobile device, the encrypted IMSI and the encrypted Ki of the carrier; and
installing, by the mobile device the IMSI on a local SIM.

* * * * *

UNITED STATES PATENT AND TRADEMARK OFFICE
CERTIFICATE OF CORRECTION

PATENT NO.         : 9,913,211 B2
APPLICATION NO.    : 14/171720
DATED              : March 6, 2018
INVENTOR(S)        : Ravi Rishy-Maharaj Page 1 of 1

It is certified that error appears in the above-identified patent and that said Letters Patent is hereby corrected as shown below:

On the Title Page

Under item number (72), please replace:
"(72) Inventor: Ravi Rishy Maharaj, Palo Alto, CA (US)"
With:
--(72) Inventor: Ravi Rishy-Maharaj, Palo Alto, CA (US)--

Signed and Sealed this
Tenth Day of July, 2018

Andrei Iancu
*Director of the United States Patent and Trademark Office*